(12) United States Patent
Gromek et al.

(10) Patent No.: US 12,496,098 B2
(45) Date of Patent: Dec. 16, 2025

(54) BONE FIXATOR WITH REMOVABLE PORTION

(71) Applicant: A-Fix Inc., Broadview Heights, OH (US)

(72) Inventors: Jason Gromek, Brecksville, OH (US); F. David Rothkopf, Ashland, MA (US); Brion Daffinson, Marietta, GA (US); Joseph Traut, Sharon, MA (US); Tom Beltavski, Broadview Heights, OH (US)

(73) Assignee: A-Fix Inc., Broadview Heights, OH (US)

( * ) Notice: Subject to any disclaimer, the term of this patent is extended or adjusted under 35 U.S.C. 154(b) by 2 days.

(21) Appl. No.: 18/701,513

(22) PCT Filed: Oct. 18, 2022

(86) PCT No.: PCT/US2022/046931
§ 371 (c)(1),
(2) Date: Apr. 15, 2024

(87) PCT Pub. No.: WO2023/069376
PCT Pub. Date: Apr. 27, 2023

(65) Prior Publication Data
US 2024/0390038 A1    Nov. 28, 2024

Related U.S. Application Data

(60) Provisional application No. 63/256,722, filed on Oct. 18, 2021.

(51) Int. Cl.
*A61B 17/64* (2006.01)
*A61B 17/00* (2006.01)

(52) U.S. Cl.
CPC ............... *A61B 17/6466* (2013.01); *A61B 2017/00991* (2013.01)

(58) Field of Classification Search
CPC ............ A61B 17/6416; A61B 17/6441; A61B 17/6466
See application file for complete search history.

(56) References Cited

U.S. PATENT DOCUMENTS 2,238,870 A * 4/1941 Haynes .................. A61B 17/66
   403/56
2,388,482 A * 11/1945 Haynes .............. A61B 17/8635
   606/54

(Continued)

OTHER PUBLICATIONS

International Search Report and Written Opinion received in International Application No. PCT/US2022/046931, mailed Feb. 8, 2023, 7 pages.

(Continued)

*Primary Examiner* — Nicholas W Woodall
(74) *Attorney, Agent, or Firm* — Kintner IP, LLC; Mary Frances Ludwig

(57) ABSTRACT

A bone fixator as disclosed herein includes at least one removable portion, and is particularly suitable for external fixation of the bones of the femur and tibia (knee joint), the tibia to the foot (ankle joint), the lower leg, the lower thigh, or the forearm and hand. Embodiments allow multiaxial, multiplanar movement, as well as procurvatum and recurvatum, on the anatomy to achieve optimal placement. Embodiments of the fixator includes four fixator joints, each of which is articulating with multiple degrees of freedom. Some fixator joint(s) include a linkage bar connectable to a multi-pin clamp having a quick connect mechanism. The multi-pin clamp is configured for fixation to a bone. Other fixator joint(s) may be connected to the multi-pin clamp in a semi-permanent or non-detachable manner. A telescoping rod assembly allows adjustment of the length of the fixator by a single individual.

16 Claims, 21 Drawing Sheets

(56) References Cited

U.S. PATENT DOCUMENTS

| | | | |
|---|---|---|---|
| 5,951,556 A | 9/1999 | Faccioli et al. | |
| 6,217,577 B1* | 4/2001 | Hofmann | A61B 17/6466 606/57 |
| 6,409,729 B1* | 6/2002 | Martinelli | A61B 17/6466 606/59 |
| 6,500,177 B1* | 12/2002 | Martinelli | A61B 17/6458 606/57 |
| 7,282,052 B2* | 10/2007 | Mullaney | A61B 17/6458 606/59 |
| 9,066,756 B2 | 6/2015 | Wong | |
| 9,078,700 B2* | 7/2015 | Ross | A61B 17/6475 |
| 9,301,782 B2 | 4/2016 | Myers et al. | |
| 9,532,805 B2 | 1/2017 | Mullaney et al. | |
| 9,675,382 B2 | 6/2017 | Bordeaux et al. | |
| 9,750,536 B2 | 9/2017 | Lorenzini et al. | |
| 9,888,943 B2 | 2/2018 | Mullaney et al. | |
| 9,924,969 B2 | 3/2018 | Triplett et al. | |
| 9,962,187 B2 | 5/2018 | Erickson | |
| 2002/0165543 A1 | 11/2002 | Winquist et al. | |
| 2004/0133199 A1* | 7/2004 | Coati | A61B 17/6458 606/54 |
| 2009/0299368 A1* | 12/2009 | Bauer | A61B 17/645 606/57 |
| 2010/0331840 A1 | 12/2010 | Ross et al. | |
| 2012/0089142 A1* | 4/2012 | Mullaney | A61B 17/6466 606/54 |
| 2014/0066931 A1* | 3/2014 | Myers | A61B 17/6425 606/59 |
| 2021/0244442 A1 | 8/2021 | Mullaney | |

OTHER PUBLICATIONS

Extended European Search Report received in European Application No. 22884325.6 dated May 12, 2025, pp. 9.

* cited by examiner

BONE FIXATOR WITH REMOVABLE PORTION

CROSS-REFERENCE TO RELATED APPLICATION

This application claims priority to U.S. provisional application No. 63/256,722, filed 18 Oct. 2021, which is incorporated by reference as if fully recited herein.

TECHNICAL FIELD

The disclosed embodiments relate generally to the field of providing external fixation for fractured bones.

BACKGROUND

Traumatic injuries to bones with severe soft tissue damage can result in extreme soft tissue swelling, open wounds, skin abrasions and complex bone fracturing. The mechanism of injury for these types of fractures is axial loading to the bones, for example, as a result of motor vehicle related injuries, sports related injuries, or other high energy injuries. Typical fracture patterns include peri-articular, intra-articular, transverse, severely comminuted closed or open fractures, and crush injuries of the bones.

SUMMARY

A bone fixator as disclosed herein includes at least one removable portion, and may include additional fixed or removable portions. Embodiments of the disclosure are particularly suitable for external fixation of the bones of the femur and tibia (knee joint), the tibia to the foot (ankle joint), the lower leg, the lower thigh, or the forearm and hand. Bone fixators are used in short term stabilization of traumatic injuries. A bone fixator may also be referred to as a temporizing fixation device, temporizing external fixator, or simply a fixation device.

The bone fixator stabilizes a patient's injury for a short period of time before a secondary procedure can be performed for definitive, open reduction/internal fixation of the fractured bones. Short-term external fixation may be used, for example, when immediate care of the traumatic injury may not be achieved at a given hospital or emergency care facility so the patient may be stabilized and transferred to a dedicated trauma hospital for further treatment. Another exemplary situation where short term external fixation is desired is in a military field, where a short-term stabilizing solution may be necessary before the patient can be transferred to an advanced military trauma hospital.

Embodiments of the bone fixator may be used for various typical fracture patterns, including: proximal tibial fracture (tibial plateau); distal femoral fracture; mid-tibial fracture; distal tibial fracture (tibial plafond or pilon fracture); tibia to foot for wound care protection; or forearm to hand for wrist fracture stabilization. Embodiments of the bone fixator may also, or instead, be used as a femoral or tibial distractor when the fixator is disconnected as a unilateral device.

Embodiments of the bone fixator may be utilized as a non-weight bearing external fixation device to protect wounds of the foot by fixating the tibia and foot to off-load the foot with the ankle in a neutral position, thereby reducing pressure on the skin to enhance wound healing. Examples of wound care protection in the foot include acute and chronic wounds associated with Charcot neuropathy and chronic foot ulcers caused by diabetes or immune system deficiencies. Examples of injuries in the wrist that may require fixation include severe crush injuries and comminuted/open and closed fractures. Examples of proximal tibial fractures include tibial plateau and distal tibial fractures, also referred to as pilon fractures. Temporary stabilization of fibular fractures may also be addressed with embodiments of the fixation device, as such injuries often occur along with severe fractures to the tibia. Embodiments of the external fixation device may be indicated for patients that are non-weight bearing.

Embodiments of the bone fixator may be used for fixation of the forearm and hand in wrist fractures. The fixator may be designed to preserve fracture length during the initial healing process until a definitive long term stabilization procedure may be achieved. In some cases, the forearm and hand may not require definitive open reduction internal fixation (ORIF), and this bone fixator could serve as the definitive treatment. In other cases, this bone fixator may be used in conjunction with ORIF.

Embodiments of the bone fixator described herein allow for multiaxial, multiplanar movement, as well as procurvatum and recurvatum movements, on the anatomy to achieve optimal placement. In embodiments of the disclosure, a telescoping rod assembly allows the operator to temporarily modify the length of the fixator without the need for assistance from additional individuals. In embodiments of the disclosure, the device allows the operator to adjust the final length once the telescoping rod assembly is locked in position. In embodiments of the disclosure, each movement area of the device may be secured in a final position using a locking mechanism (e.g., set screws and a driver).

Embodiments of the bone fixator may include the following features alone or in combination.

According to one or more embodiments, a bone fixator includes:
- at least two multi-pin clamps structurally configured for fixation to a bone;
- a first portion including a telescoping rod assembly terminating in a fixator joint on each of two opposing ends, each fixator joint of the first portion including a linkage bar removably connectable to one of the at least two multi-pin clamps; and
- wherein each fixator joint is structurally configured for articulation in multiple independent rotational degrees of freedom.

According to one or more embodiments, the bone fixator includes a second portion including a telescoping rod assembly terminating in a fixator joint on each of two opposing ends, each fixator joint of the second portion including a linkage bar connectable to one of the at least two multi-pin clamps.

According to one or more embodiments, the bone fixator includes each fixator joint including a joint housing, the linkage bar extending from the joint housing and rotatably positionable within the joint housing.

According to one or more embodiments, the bone fixator includes each linkage being rotatably positionable within the joint housing over an angular range of at least 85 degrees.

According to one or more embodiments, the bone fixator includes each fixator joint being rotatably positionable about a central longitudinal axis of the linkage bar.

According to one or more embodiments, the bone fixator includes each fixator joint being rotatably positionable about the central longitudinal axis of the linkage bar over angular range of 360 degrees.

According to one or more embodiments, the bone fixator includes each multi-pin clamp including an adjustably positionable internal rail having a scalloped face structurally configured to retain a bone screw within the multi-pin clamp.

According to one or more embodiments, the bone fixator includes a quick release mechanism structurally configured to decouple the linkage bar from the multi-pin clamp.

According to one or more embodiments, the bone fixator includes the telescoping rod assembly having an adjustable length.

According to one or more embodiments, the bone fixator includes the telescoping rod assembly being rotatably positionable within the joint housing.

According to one or more embodiments, the bone fixator includes each multi-pin clamp having a locking joint knob configured to retain the fixator joint in position.

According to one or more embodiments, a bone fixator includes:
- two multi-pin clamps structurally configured for fixation to a bone, the multi-pin clamps each having a first side and an opposing second side;
- a first portion including a telescoping rod assembly terminating in a fixator joint on each of two opposing ends, each fixator joint of the first portion including a linkage bar removably connectable to the first side of each of the two multi-pin clamps;
- a second portion including a telescoping rod assembly terminating in a fixator joint on each of two opposing ends, each fixator joint of the second portion including a linkage bar removably connectable to the second side of each of the two multi-pin clamps; and
- wherein each fixator joint is structurally configured for articulation in multiple independent rotational degrees of freedom.

According to one or more embodiments of a fixator joint for a bone fixator in cooperation with a bone clamp, the fixator joint includes:
- a joint housing;
- a linkage bar extending from the joint housing and structurally configured for removable connectable to the bone clamp;
- wherein the linkage bar is rotatably positionable within the joint housing;
- wherein the joint housing and the linkage bar are rotatably positionable about a longitudinal axis of the linkage bar when the linkage bar is connected to the bone clamp; and
- wherein the joint housing is rotatably positionable about a longitudinal axis of a rod of the bone fixator.

These and other aspects of the embodiments will be better appreciated and understood when considered in conjunction with the following description and the accompanying drawings. The following description, while indicating various embodiments and details thereof, is given by way of illustration and not of limitation. Many substitutions, modifications, additions, or rearrangements may be made within the scope of the embodiments, and the embodiments may include all such substitutions, modifications, additions, or rearrangements.

BRIEF DESCRIPTION OF THE DRAWINGS

Non-limiting and non-exhaustive embodiments of the bone fixator with removable portion are described with reference to the following figures, wherein like reference numerals refer to like parts throughout the various views unless otherwise specified.

Figure 1:
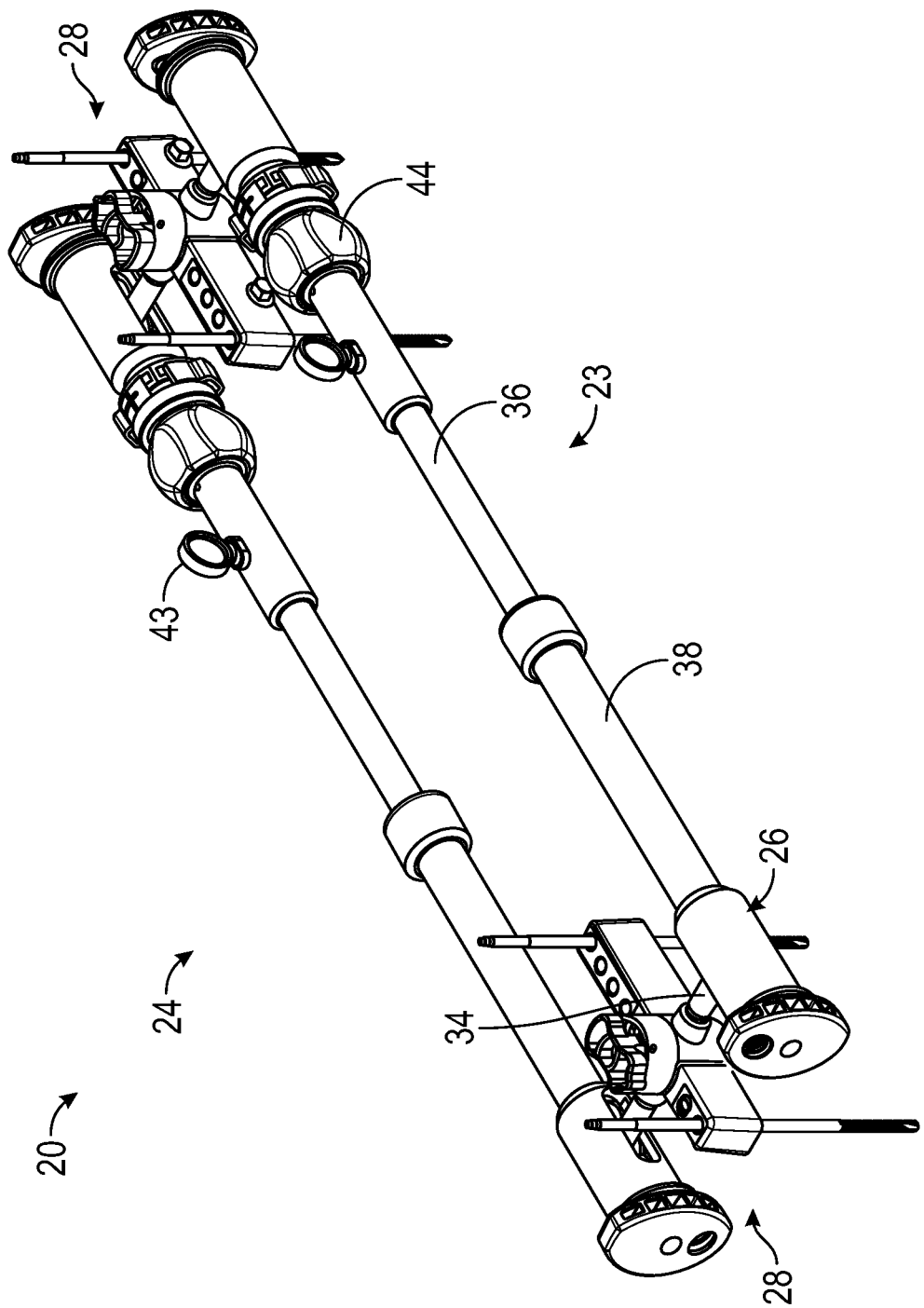
FIG. 1 is a perspective view of an embodiment of a bone fixator.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. Also, common but well-understood elements that are useful or necessary in a commercially feasible embodiment are often not depicted in order to facilitate a less obstructed view of these various embodiments.

LIST OF DRAWING REFERENCE NUMERALS 20 bone fixator
22 fixed portion 23 first removable portion
24 second removable portion
26 fixator joint
28 multi-pin clamp
29 aperture
30 first button
32 fixed linkage bar
34 linkage bar
35 clamp knob
36 internal tube
38 external tube
40 telescoping rod assembly
43 locking tab
44 adjustment handle
45 clutch
46 bone screw
48 quick connect mechanism
50 circumferential groove
52 fastener
54 joint housing
56 joint knob
58 sleeve
60 spring
63 joint tube
68 set screw
69 fastener
70 second button
72 rail
74 scalloped face
80 flat surface
81 rod
83 plug
84 adapter
86 attachment
502 trocar
512 tip
522 flat end
504 drill sleeve
514 concave surface
524 handle

DETAILED DESCRIPTION

The detailed description describes non-limiting exemplary embodiments. Any individual features may be combined with other features as required by different applications for at least the benefits described herein.

As used herein, the term "shaped" means that an item has the overall appearance of a given shape even if there are minor variations from the pure form of said given shape.

As used herein, the terms "generally" or "substantially" when referring to a shape mean that an ordinary observer will perceive that an object has said shape even if there are minor variations from said shape.

As used herein, relative orientation terms, such as "up", "down", "top", "bottom", "left", "right", "vertical", "horizontal", "distal" and "proximal" are defined with respect to an initial presentation of an object and will continue to refer to the same portion of an object even if the object is subsequently presented with an alternative orientation, unless otherwise noted.

Standard medical terms may be used to indicate orientation, such as "superior" indicating towards the head, "inferior" indicating away from the head, "anterior" indicating towards the front, "posterior" indicating towards the back, "medial" indicating towards the middle, and "lateral" indicating away from the midline. "Procurvatum" refers to separated bone ends forming an apex or convex surface, and "recurvatum" refers to separated bones forming a concave surface.

As used herein, the conjunction "or" is to be construed inclusively (e.g., "A or B" would be interpreted as "A, or B, or both A and B"; e.g., "A, B, or C" would be interpreted as "A; or B; or C; or any two of A, B, and C; or all three of A, B, and C").

As used herein with reference to a numerical value, the terms "about", "approximately", or "substantially" refer to a range of values within plus or minus 10% of the specified number.

As used herein, the verb "may" is used to designate optionality/noncompulsoriness. In other words, something that "may" can, but need not. In the present disclosure, the verb "comprise" may be understood in the sense of including. Accordingly, the verb "comprise" does not exclude the presence of other elements/actions. In the present disclosure, relational terms such as "first," "second," "top," "bottom" and the like may be used solely to distinguish one entity or action from another entity or action without necessarily requiring or implying any actual such relationship or order between such entities or actions.

As used herein, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

As used herein, expressions in parentheses may be understood as being optional. As used in the present disclosure, quotation marks may emphasize that the expression in quotation marks may also be understood in a figurative sense. As used in the present disclosure, quotation marks may identify a particular expression under discussion.

Figure 2:
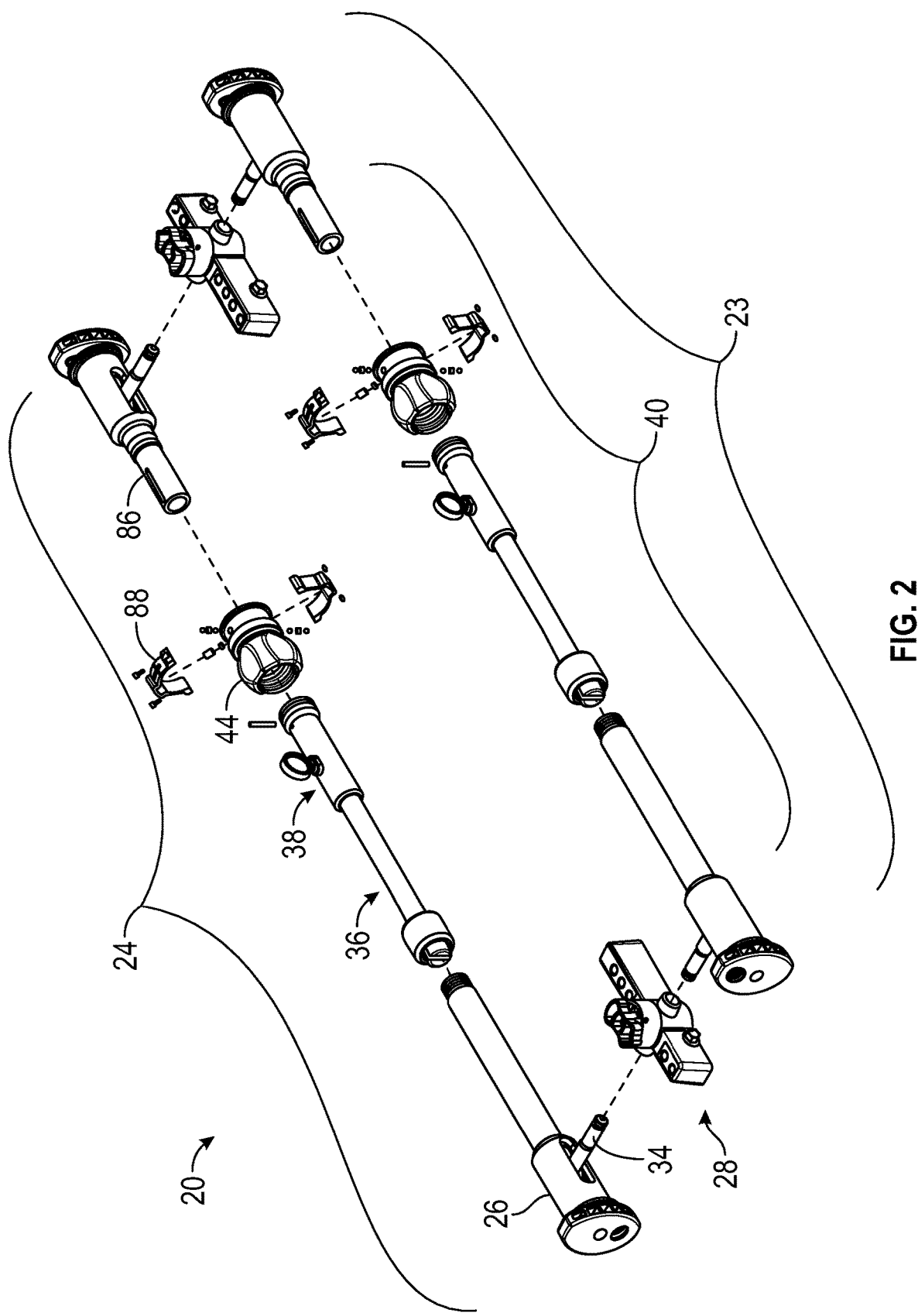
FIG. 2 is an exploded perspective view of an embodiment of the bone fixator.
Figure 3:
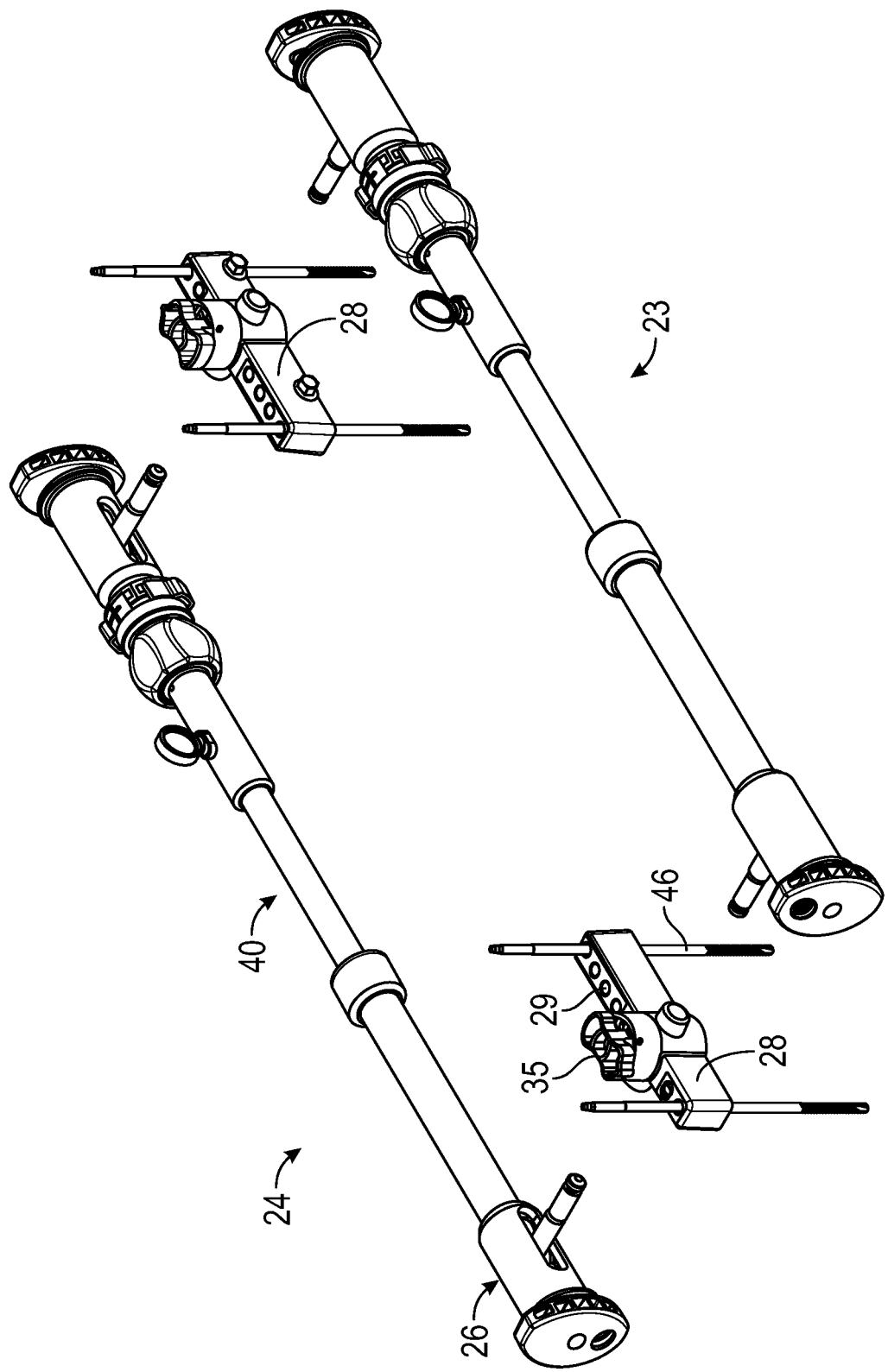
FIG. 3 is a partially exploded perspective view of an embodiment of the bone fixator.

FIGS. 1-3 are perspective, exploded perspective, and partially exploded perspective views, respectively, of an embodiment of a bone fixator generally designated as 20. The shown embodiment is particularly suitable for external fixation of the bones of the lower thigh, knee joint, lower leg, ankle joint, forearm, or hand. Bone fixator 20 includes a first removable portion 23 and a second removable portion 24. In the shown embodiment, bone fixator 20 includes four fixator joints 26, where one of the fixator joints 26 is located on each of two opposing ends of first removable portion 23 and second removable portion 24. Bone fixator 20 also includes two multi-pin clamps 28 which are structurally configured for fixation to a bone. Either one or both of first and second removable portions 23, 24 may quickly and easily be disconnected from at least one multi-pin clamp 28 while the multi-pin clamp 28 may remain fixed to the patient.

In the shown embodiment, bone fixator 20 includes four fixator joints 26, two multi-pin clamps 28, and two telescoping rod assemblies 40. Each of the first and second removable portions 23, 24 includes one of the telescoping rod assemblies 40 with a fixator joint 26 at each end. Fixator joints 26 may each include a linkage bar 34. The linkage bars are configured for rapid attachment to and detachment from multi-pin clamp 28; this feature is described in more detail below with reference to FIGS. 4-7.

Multiple bone screws 46 may be inserted through apertures 29 in multi-pin clamp 28 to fixate the device to bone (six apertures are present in each multi-pin clamp of the shown embodiment). The bone screws may be retained in the multi-pin clamp by a locking system, described below with reference to FIGS. 14-15.

Figure 4A:
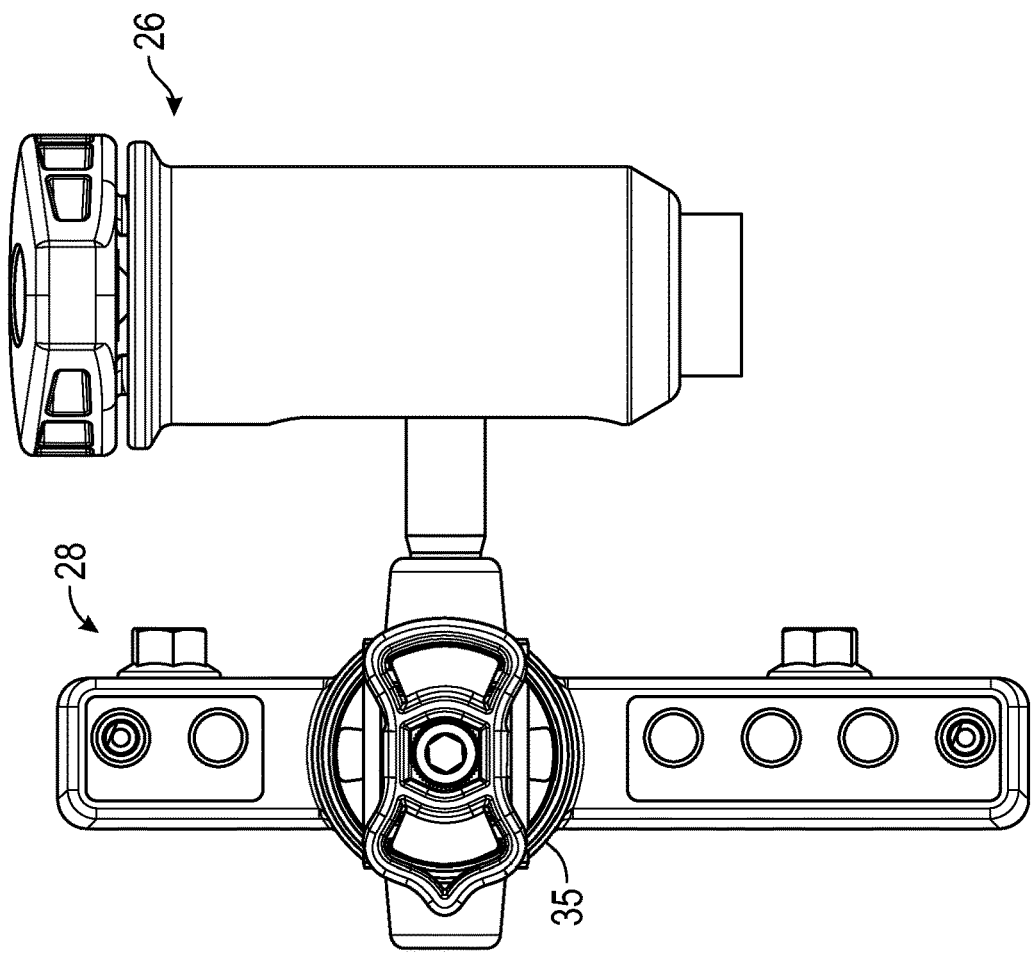
FIG. 4A is an enlarged top plan view of a portion of an embodiment of the bone fixator, showing a first fixator joint disengaged from a multi-pin clamp.
Figure 4A:
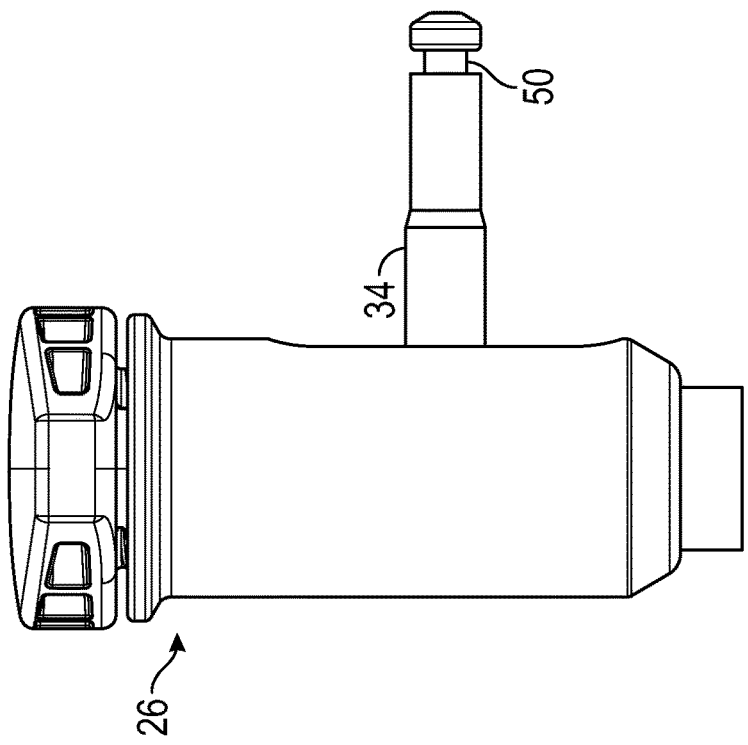
Figure 4B:
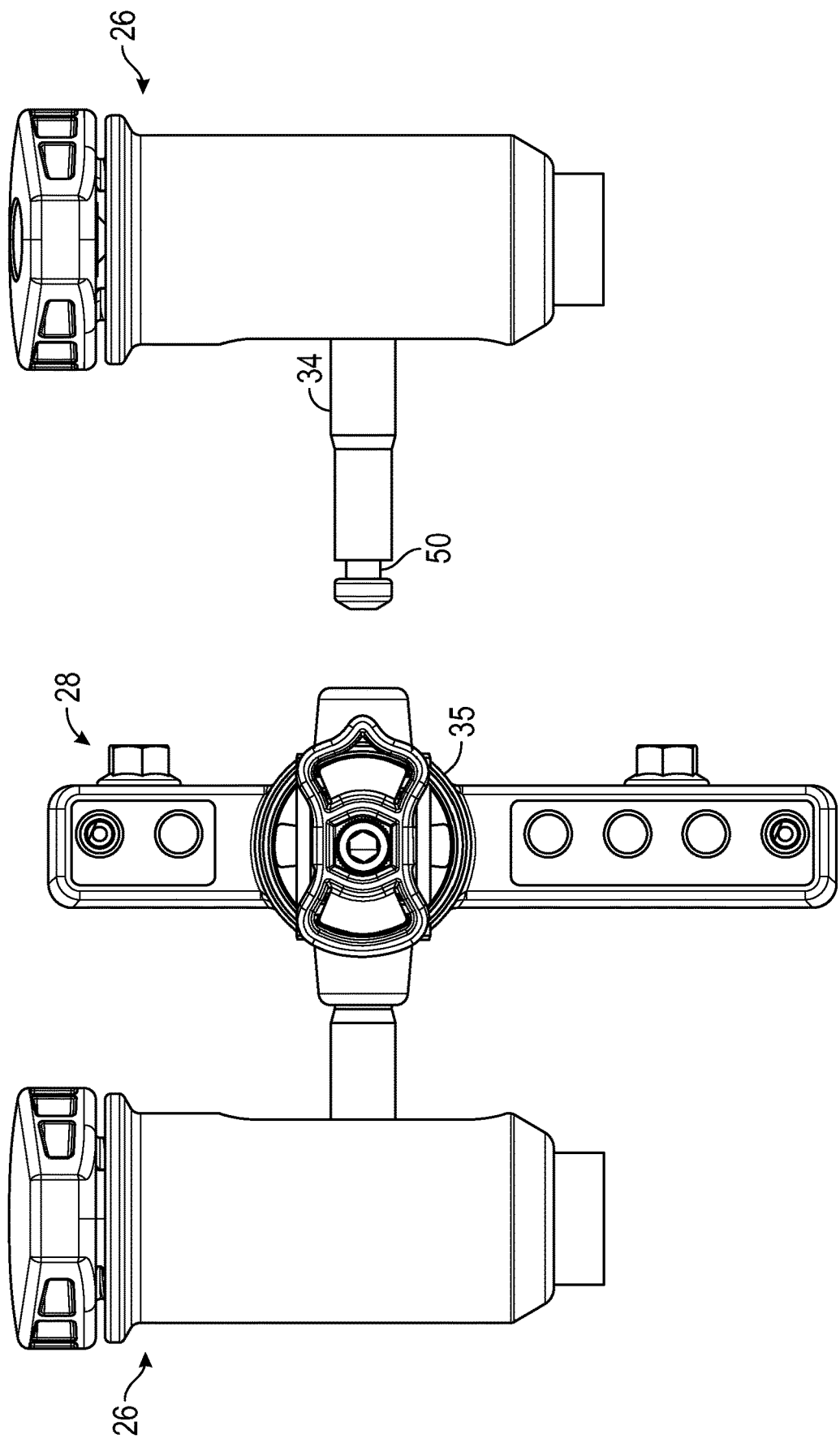
FIG. 4B is an enlarged top plan view of a portion of an embodiment of the bone fixator, showing a second fixator joint disengaged from a multi-pin clamp.
Figure 5:
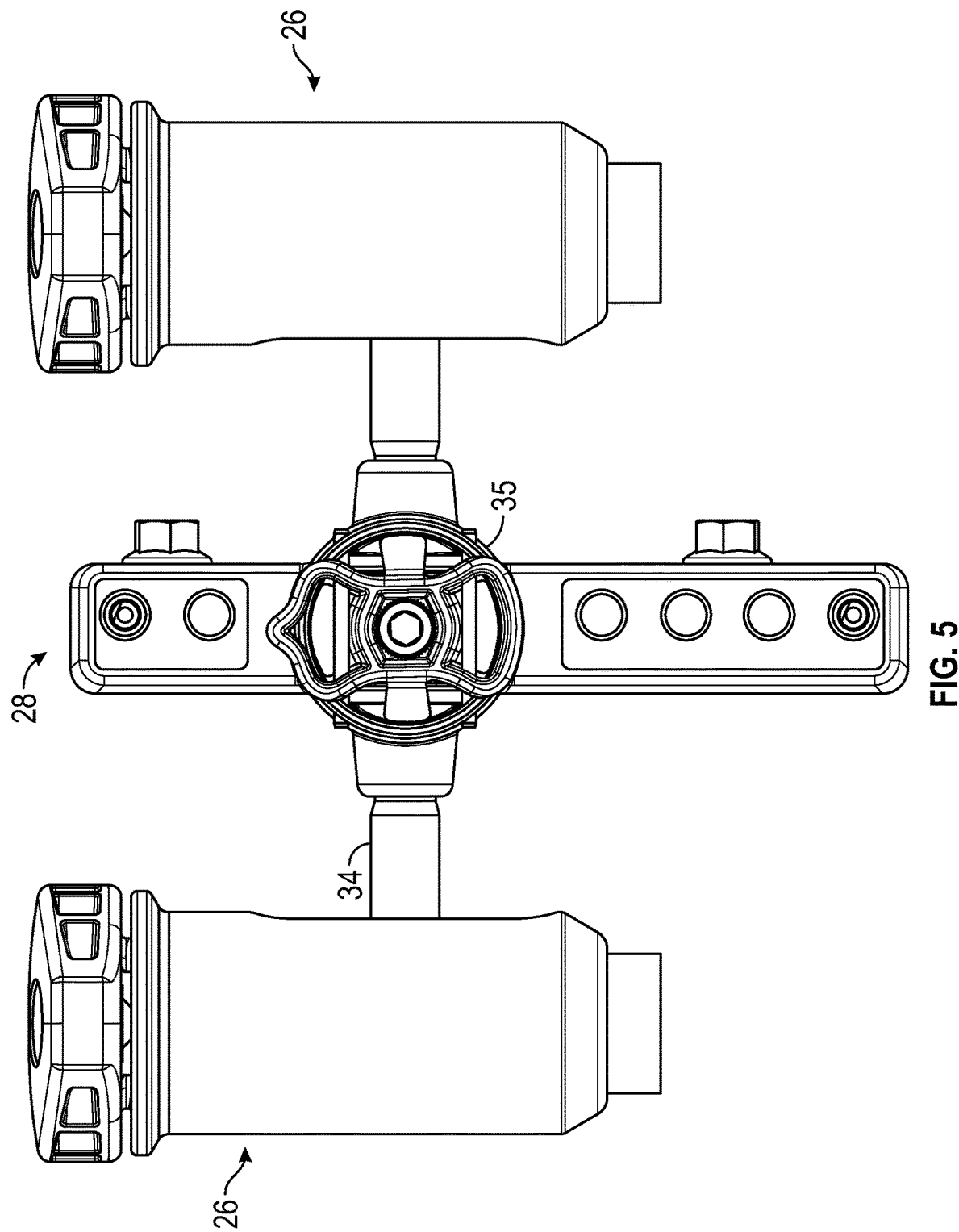
FIG. 5 is an enlarged top plan view of a portion of an embodiment of the bone fixator, showing the fixator joint engaged with the multi-pin clamp.

FIGS. 4A, 4B, & 5 are enlarged top plan views of a portion of an embodiment of the bone fixator. In FIG. 4A, a first fixator joint 26 (at left) is shown disengaged from multi-pin clamp 28, and a second fixator joint 26 (at right) is shown engaged with multi-pin clamp 28. In FIG. 4B, the first fixator joint 26 (at left) is shown engaged with multi-pin clamp 28, while the second fixator joint 26 (at right) is shown disengaged from multi-pin clamp 28. In FIG. 5, both first and second fixator joints 26 are shown engaged with multi-pin clamp 28. Each fixator joint 26 includes a linkage bar 34 which engages with multi-pin clamp 28. A clamp knob 35 on the multi-pin clamp controls the engagement of the linkage bars. By engaging or disengaging fixator joints 26 in this manner, first removable portion 23 and second removable portion 24 can be attached or removed from the bone fixator.

Figure 6:
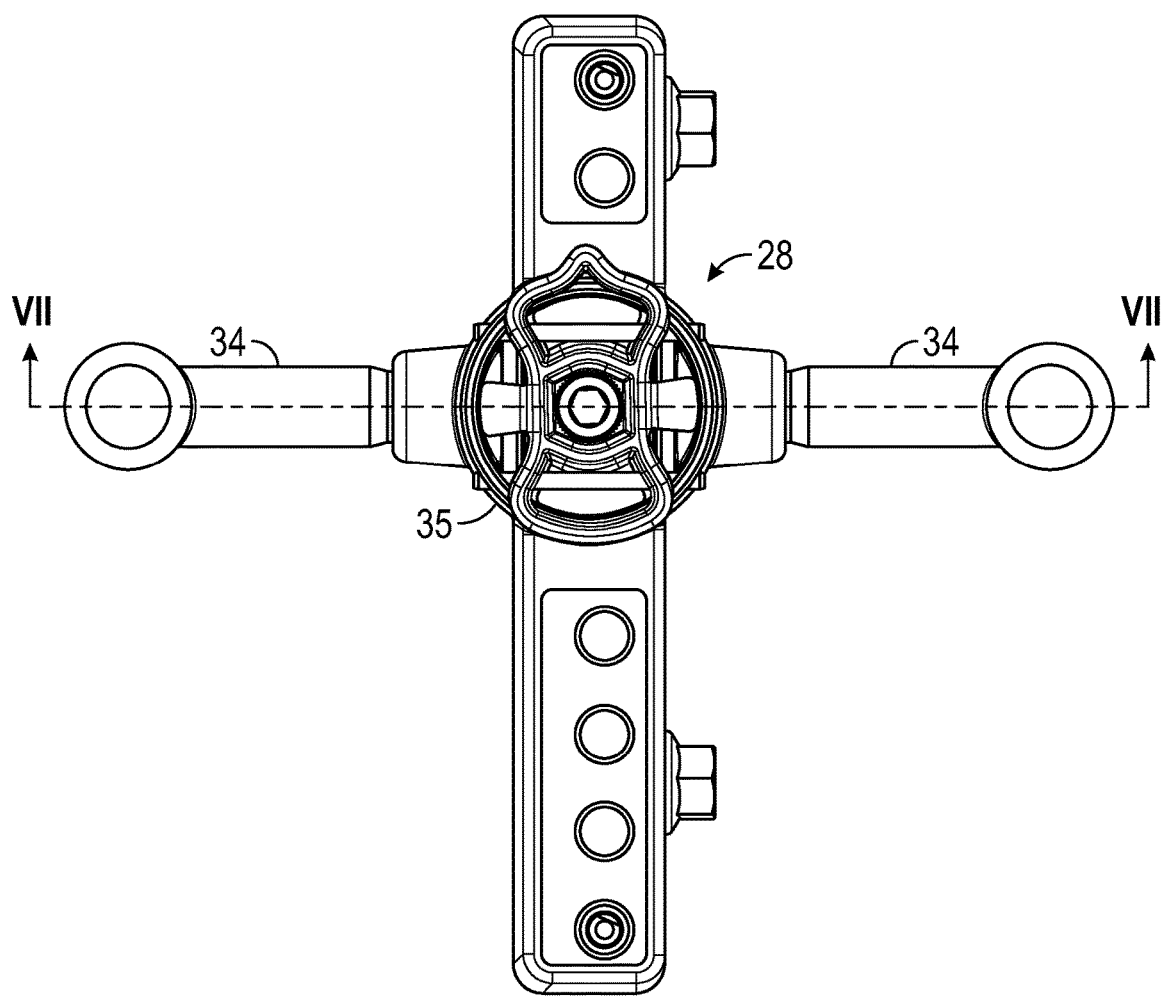
FIG. 6 is an enlarged top plan view of a portion of an embodiment of the bone fixator.
Figure 7:
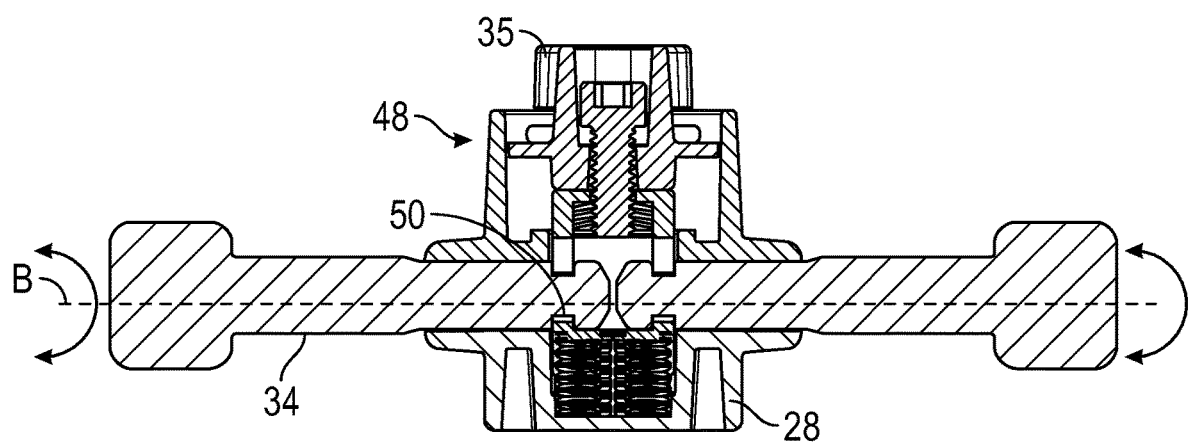
FIG. 7 is a cross-sectional view along the line VII-VII of FIG. 6.

FIG. 6 is an enlarged top plan view of a portion of an embodiment of the bone fixator, where some components of the fixator joints are omitted for clarity. FIG. 7 is a cross-sectional view along the line VII-VII of FIG. 6. Clamp knob 35 actuates one or more spring-type quick connect mechanisms 48 which are located internally to multi-pin clamp 28. Clamp knob 35 may, for example, be threadably engaged to actuate mechanism 48. Mechanism 48 engages a circumferential groove 50 on the shaft of linkage bar 34 (see also FIGS. 4A & 4B). Mechanism 48 resists decoupling of linkage bar 34, while also allowing the linkage bar to rotate 360 degrees about axis B (e.g., along circumferential groove 50) while engaged with multi-pin clamp 28 (direction of rotation indicated by the directional arrow at the left of FIG. 7).

Figure 8:
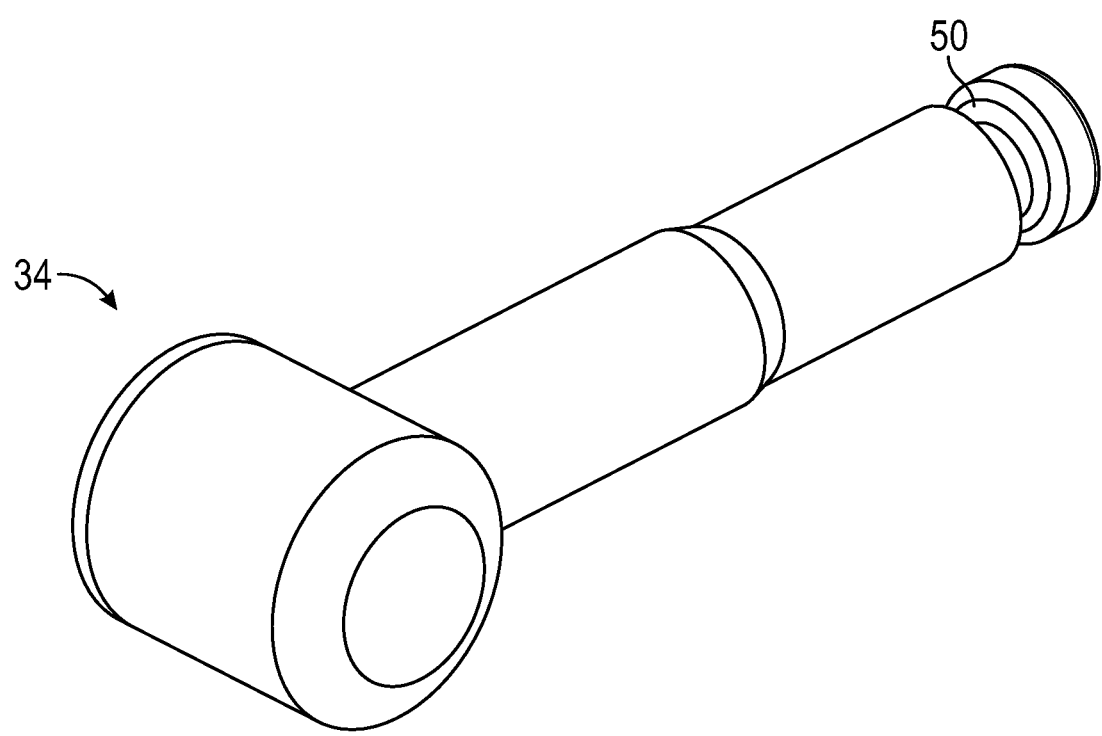
FIG. 8 is an enlarged perspective view of an embodiment of a linkage bar.

FIG. 8 is an enlarged perspective view of an embodiment of linkage bar 34, showing circumferential groove 50 on the shaft of the linkage bar.

Figure 13:
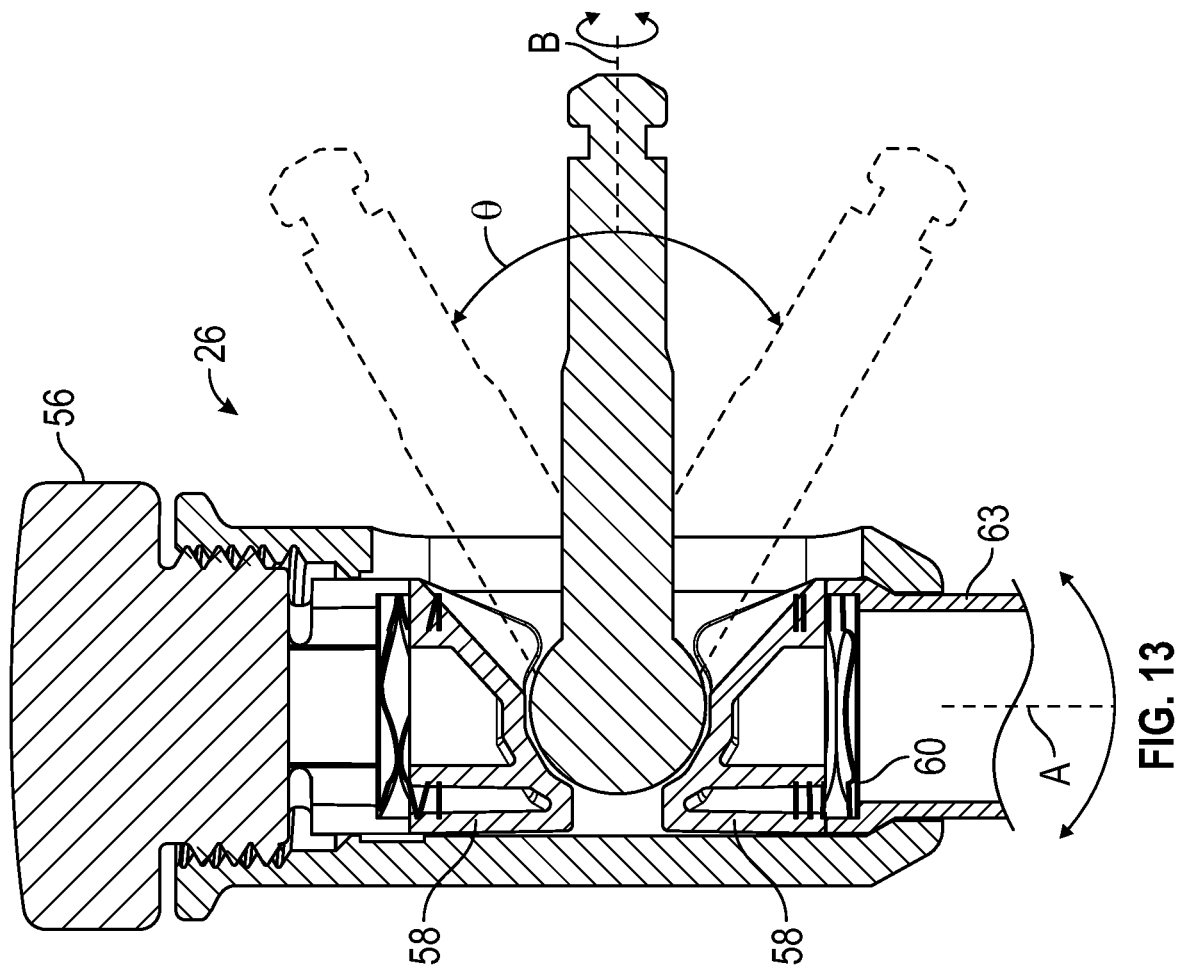
FIG. 13 is a cross-sectional view along the line XIII-XIII of FIG. 12.
Figure 12:
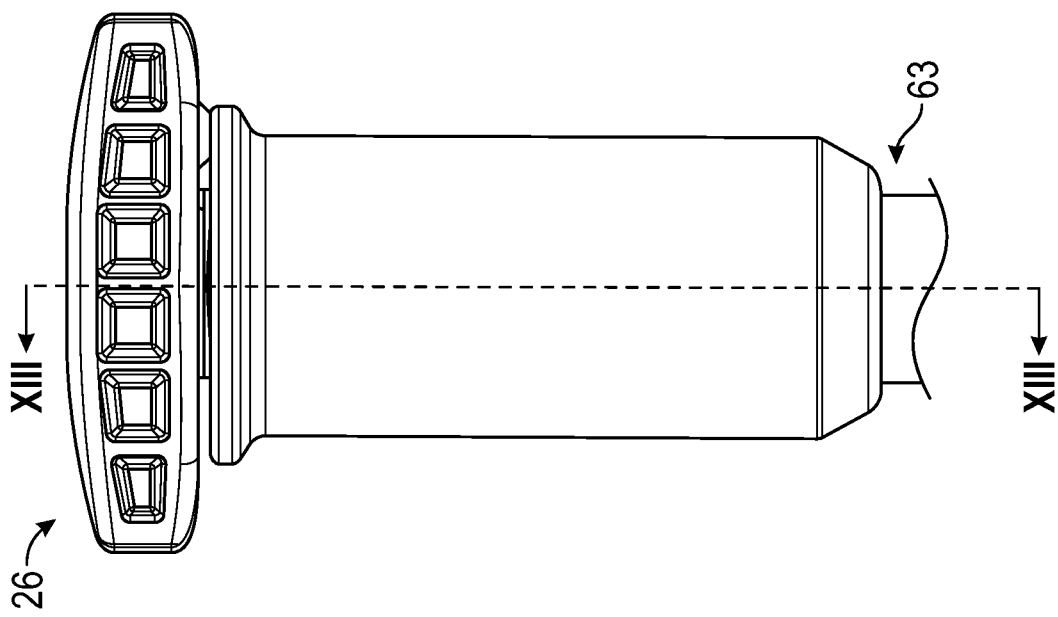
FIG. 12 is an enlarged external side view of an embodiment of a fixator joint.

FIGS. 9-12 are enlarged perspective, internal side, exploded perspective, and external side views, respectively, of an embodiment of fixator joint 26. FIG. 13 is a cross-sectional view along the line XIII-XIII of FIG. 12. In the shown embodiment, linkage bar 34 is housed within fixator joint 26, and surrounded by two sleeves 58 which have a shape which is generally complementary to a barrel-shaped end of the linkage bar.

Figure 9:
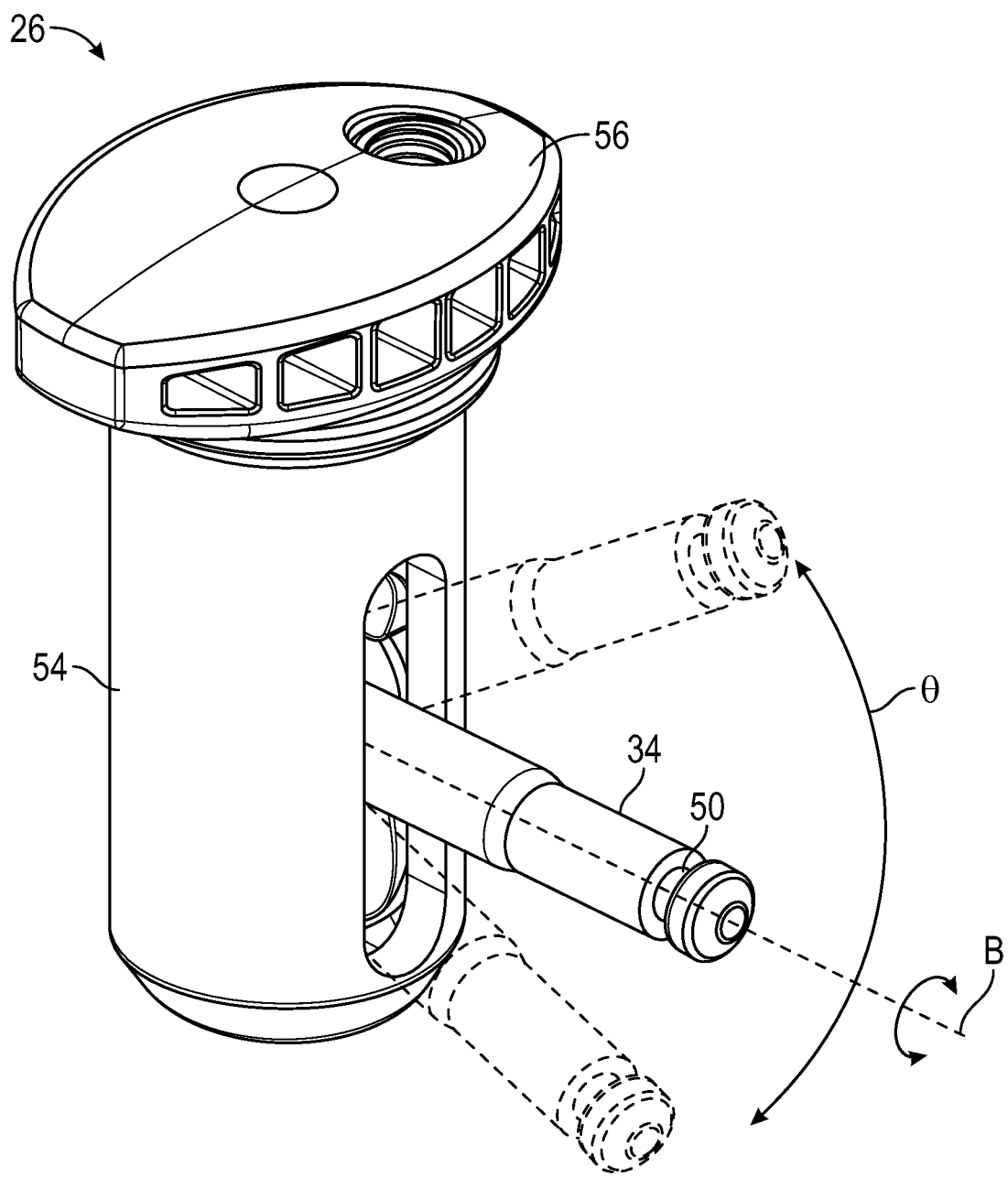
FIG. 9 is an enlarged perspective view of an embodiment of a fixator joint.
Figure 10:
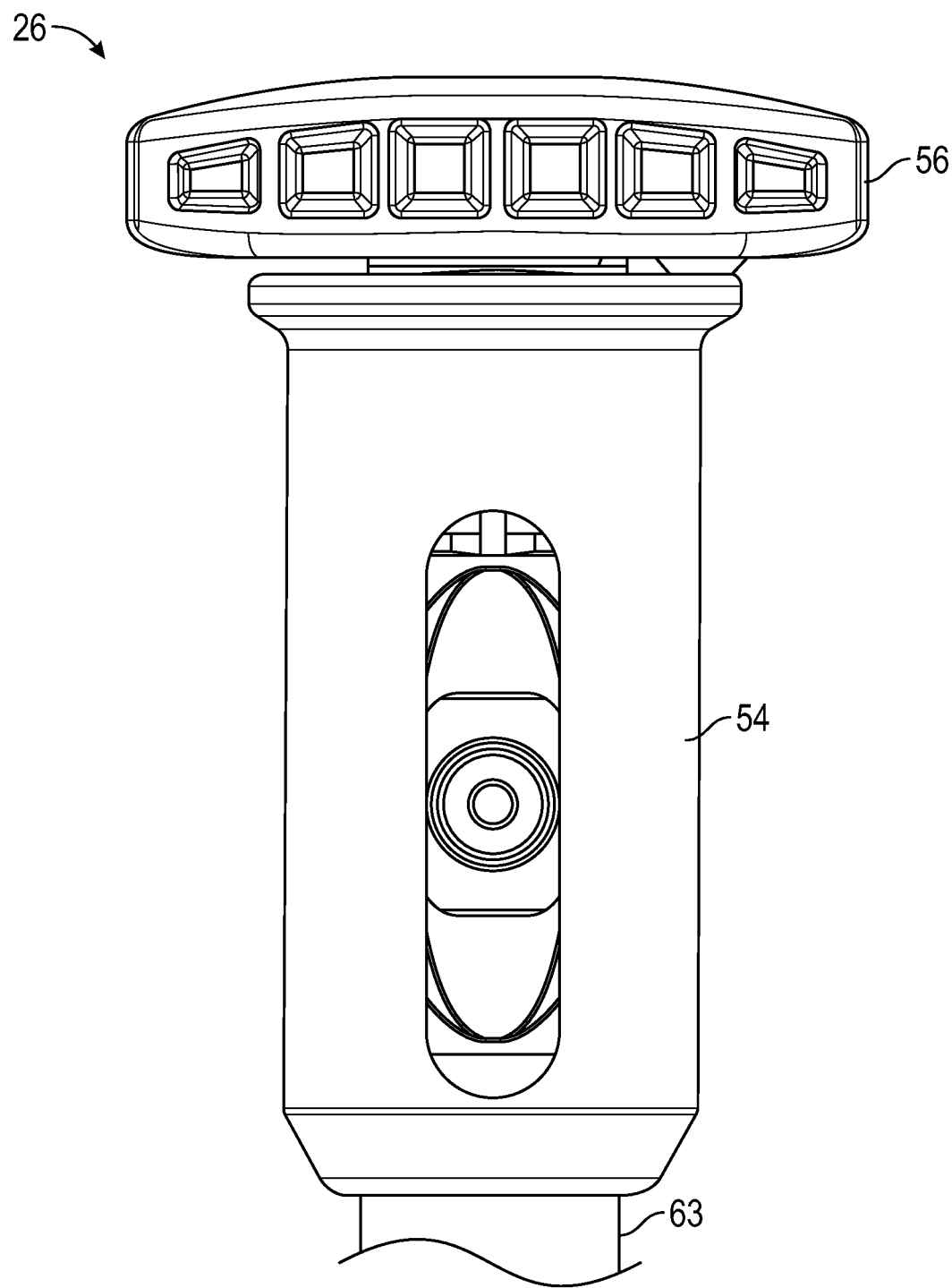
FIG. 10 is an enlarged internal side view of an embodiment of a fixator joint.

As can be seen in FIGS. 9 & 13, fixator joint 26 is structurally configured for articulation in multiple independent rotational degrees of freedom (e.g., three degrees of freedom shown). First, linkage bar 34 is positionable within joint housing 54 over an angular range of θ. In one embodiment, θ may be about 85 degrees. Second, the fixator joint 26 may be rotated 360 degrees about the central longitudinal axis A of telescoping rod assembly 40. Third, as described with reference to FIG. 7, the fixator joint may rotate about axis B of the linkage bar while engaged with multi-pin clamp 28.

A joint knob 56 connects to joint housing 54 and is used to tighten the internal mechanism of the fixator joint. Two springs 60 may be located within joint housing 54, and the linkage bar and sleeves 58 may be sandwiched between the springs (see FIG. 11). When joint knob 56 is tightened to joint housing 54 and applies sufficient force to the internal components of the fixator joint, the three degrees of freedom discussed may be locked in position.

Figure 11:
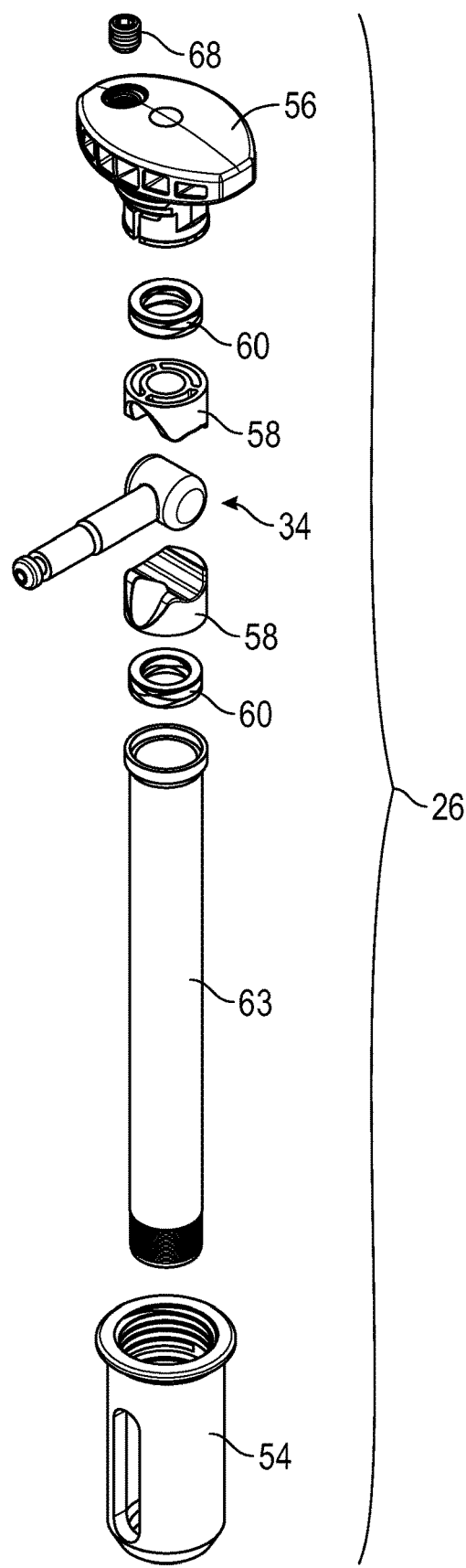
FIG. 11 is an enlarged, exploded perspective view of an embodiment of the fixator joint.

FIG. 11 further illustrates additional internal components of an embodiment of the fixator joint. A joint tube 63 extends through joint housing 54 and is configured for connection to the telescoping rod assembly. A set screw 68 may be present in joint knob 56 and may be configured to engage with joint housing 54.

Figure 14:
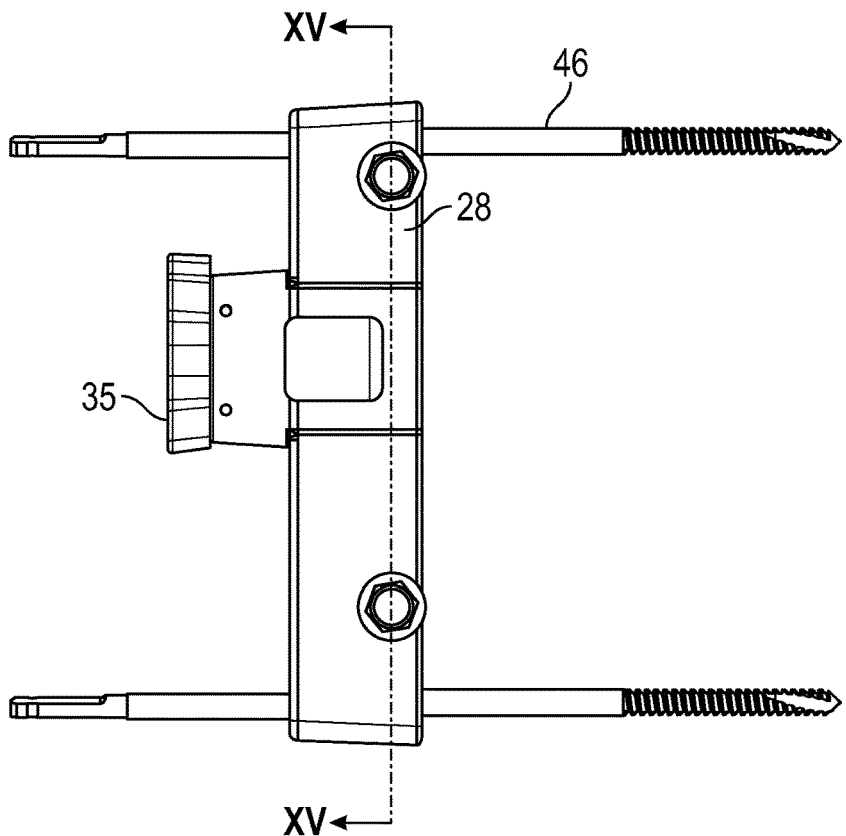
FIG. 14 is an enlarged end view of a portion of an embodiment of the bone fixator.
Figure 15:
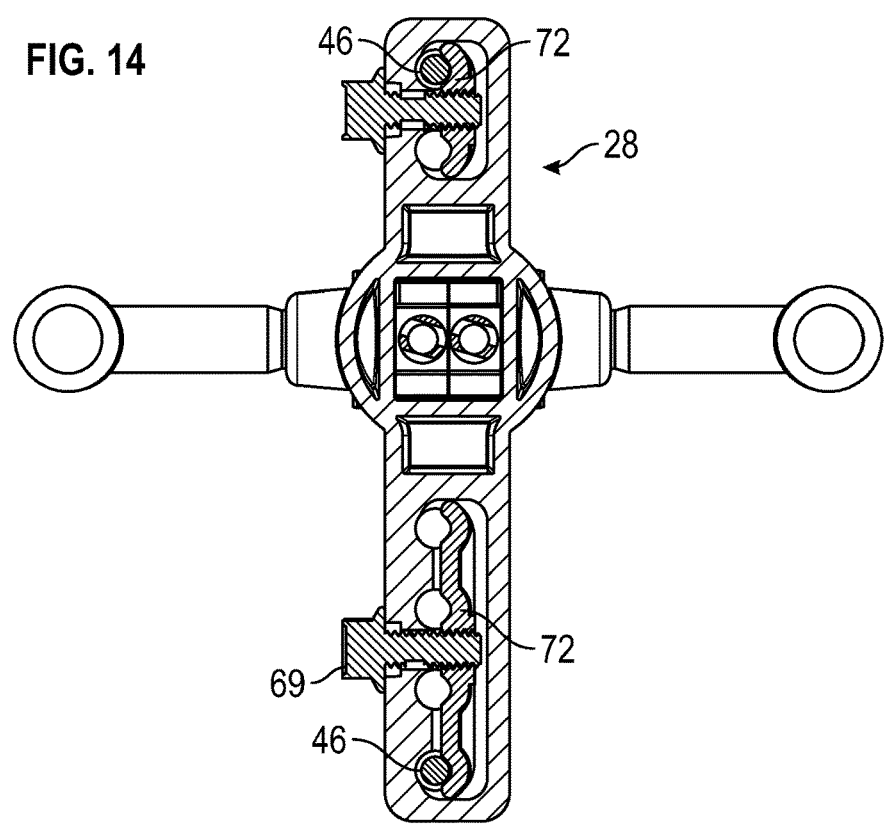
FIG. 15 is a cross-sectional view along the line XV-XV of FIG. 14.

FIG. 14 shows an end view of an embodiment of the bone fixator, wherein a portion of each fixator joint 26 is omitted for clarity. FIG. 15 is a cross-sectional view along the line XV-XV of FIG. 14. Two bone screws 46 are shown connected to multi-pin clamp 28, and in a locked position.

Figure 16:
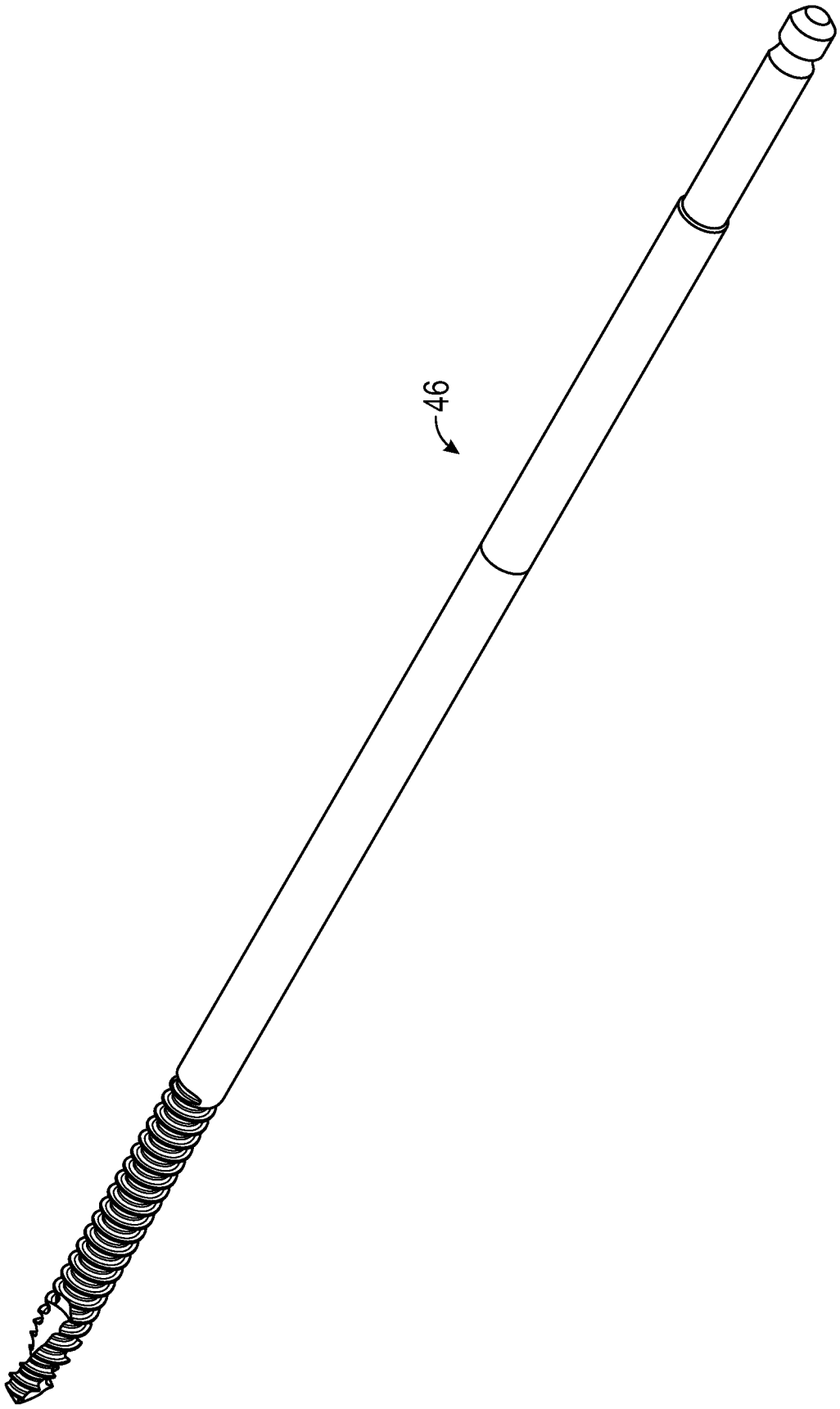
FIG. 16 is an enlarged perspective view of an embodiment of a bone screw.
Figure 17:
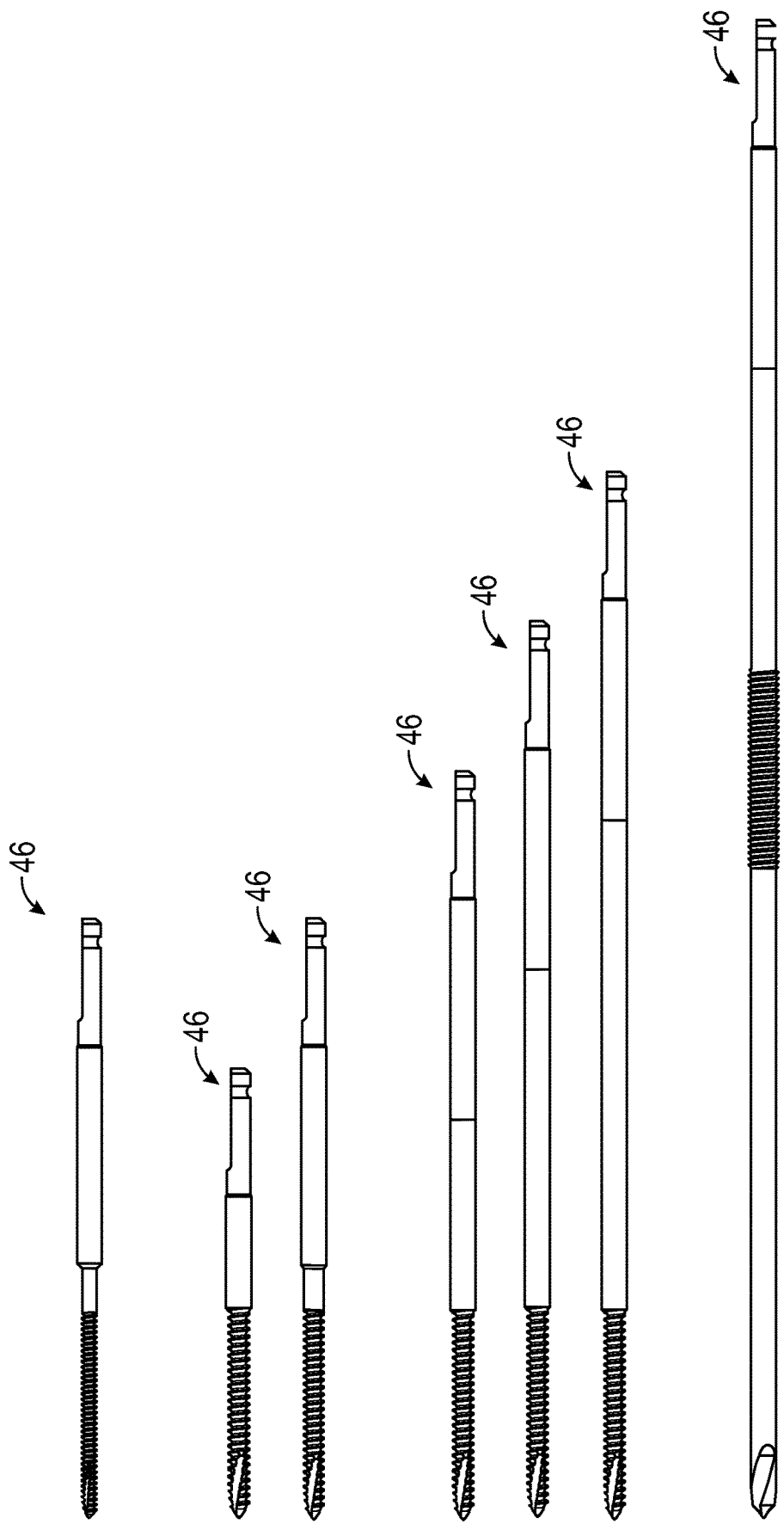
FIG. 17 is an enlarged side view of embodiments of bone screws.

FIGS. 16 & 17 are enlarged perspective and side views, respectively, of embodiments of bone screws 46.

As best seen in FIG. 15, one or more rails 72 are located internal to multi-pin clamp 28 and are each connected to a fastener 69 (e.g., a screw). Rail 72 have one or more scalloped faces 74 which are oriented toward the bone screws. Scalloped faces 74 have alternating angled, flat edges and scalloped, or concave, edges. The flat edges of scalloped face 74 may be positioned flush with a bone screw 46 to hold the screw in a locked position which resists rotation of the screw within the clamp. Rails 72 may be moved between locked and free positions by adjusting fastener 69.

FIGS. 16 & 17 show examples of bone screws (or pins) suitable for use with bone fixator 20. The bone screws may be partially threaded, self-tapping, and/or self-drilling. An AO coupling (Association for Osteosynthesis) may be present on the non-threaded portion to allow easy connection to a drill for driving the bone screw into a bone or removing the bone screw from the bone. Exemplary sizes of bone screws 46 which may cooperate with multi-pin clamp 28 include: a hybrid-5 mm/3 mm×40 mm×120 mm bone screw suitable for fixating the metatarsal; a hybrid 5 mm/4 mm×40 mm×90 mm bone screw; a hybrid 5 mm/4 mm×40 mm×120 mm bone screw; a 5 mm×40 mm×150 mm bone screw suitable for fixating the tibia; a 5 mm×40 mm×150 mm bone screw suitable for fixating the femur; a 5 mm×40 mm×210 mm bone screw; and a hybrid 5 mm/6 mm×40 mm×300 mm bone screw. The 3 mm and 5 mm bone screws can be drilled directly into bone or inserted into bone after appropriate drills have been utilized prior to insertion to help prevent possible thermal necrosis. In some embodiments, bone screws may be provided in a kit along with a bone fixator. In other embodiments, the bone screws may be provided separately for cooperation with the bone fixator.

Figure 18:
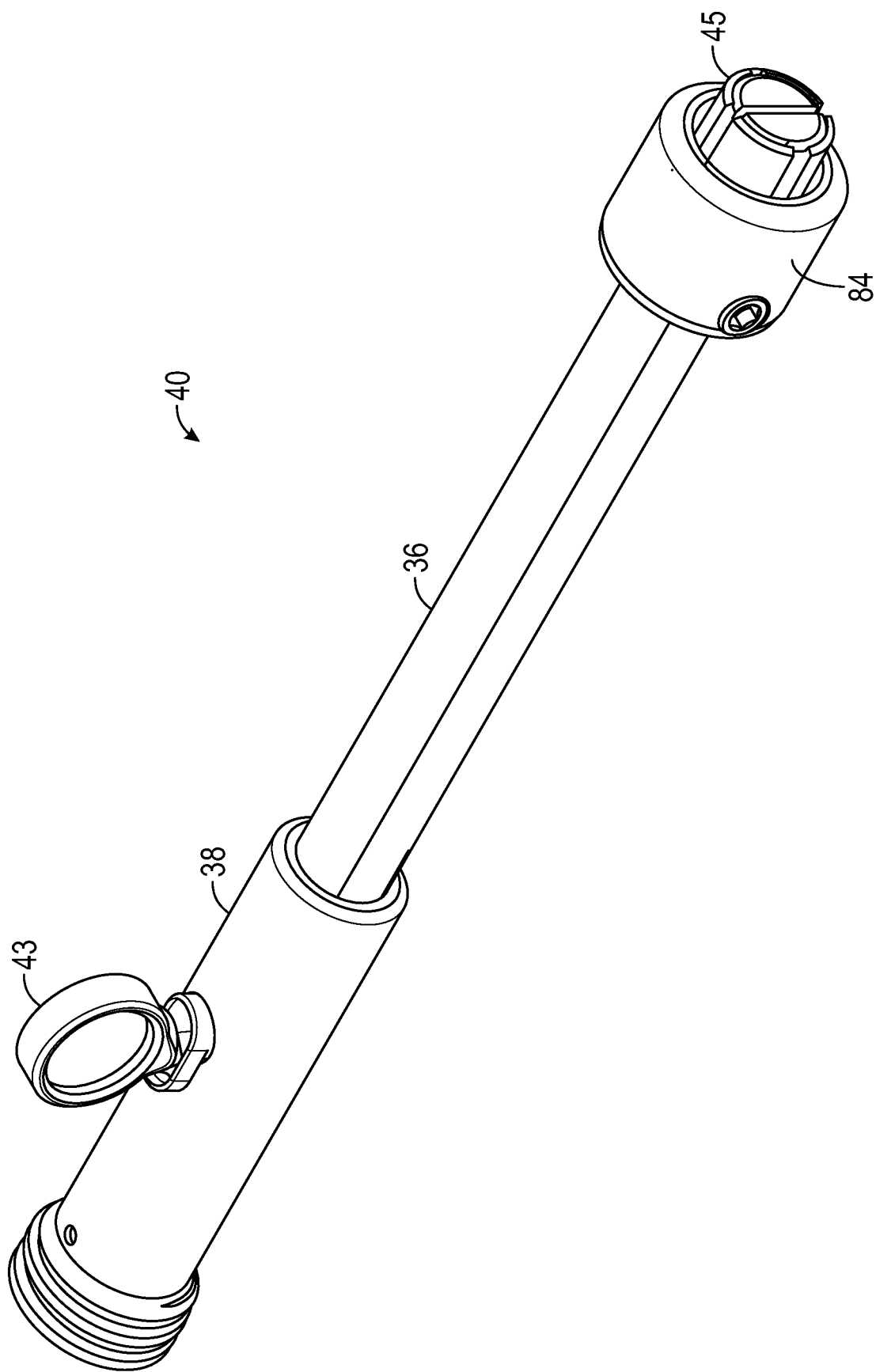
FIG. 18 is an enlarged perspective view of an embodiment of a telescoping rod assembly.
Figure 19:
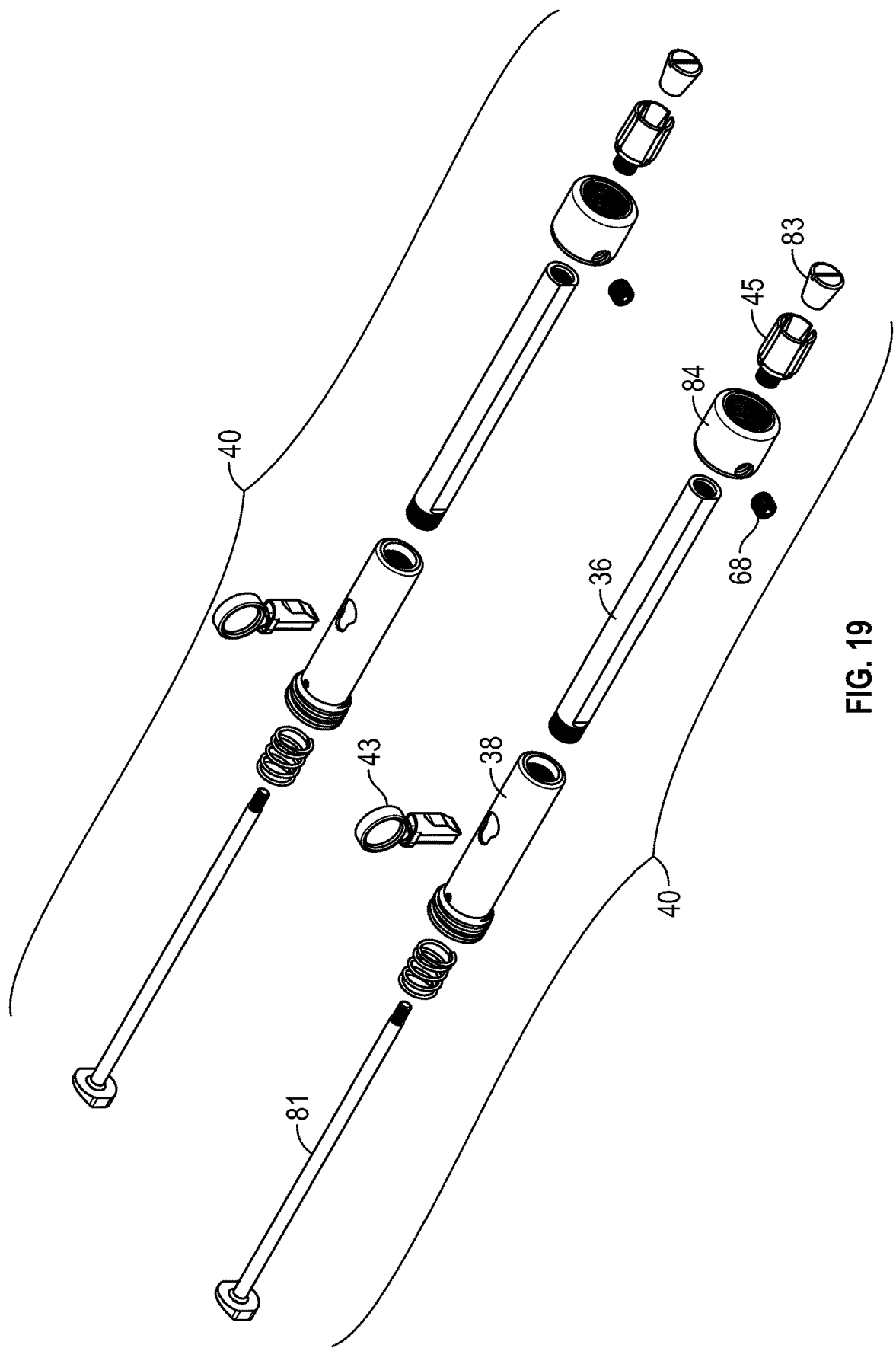
FIG. 19 is an exploded perspective view of an embodiment of the telescoping rod assembly.
Figure 20:
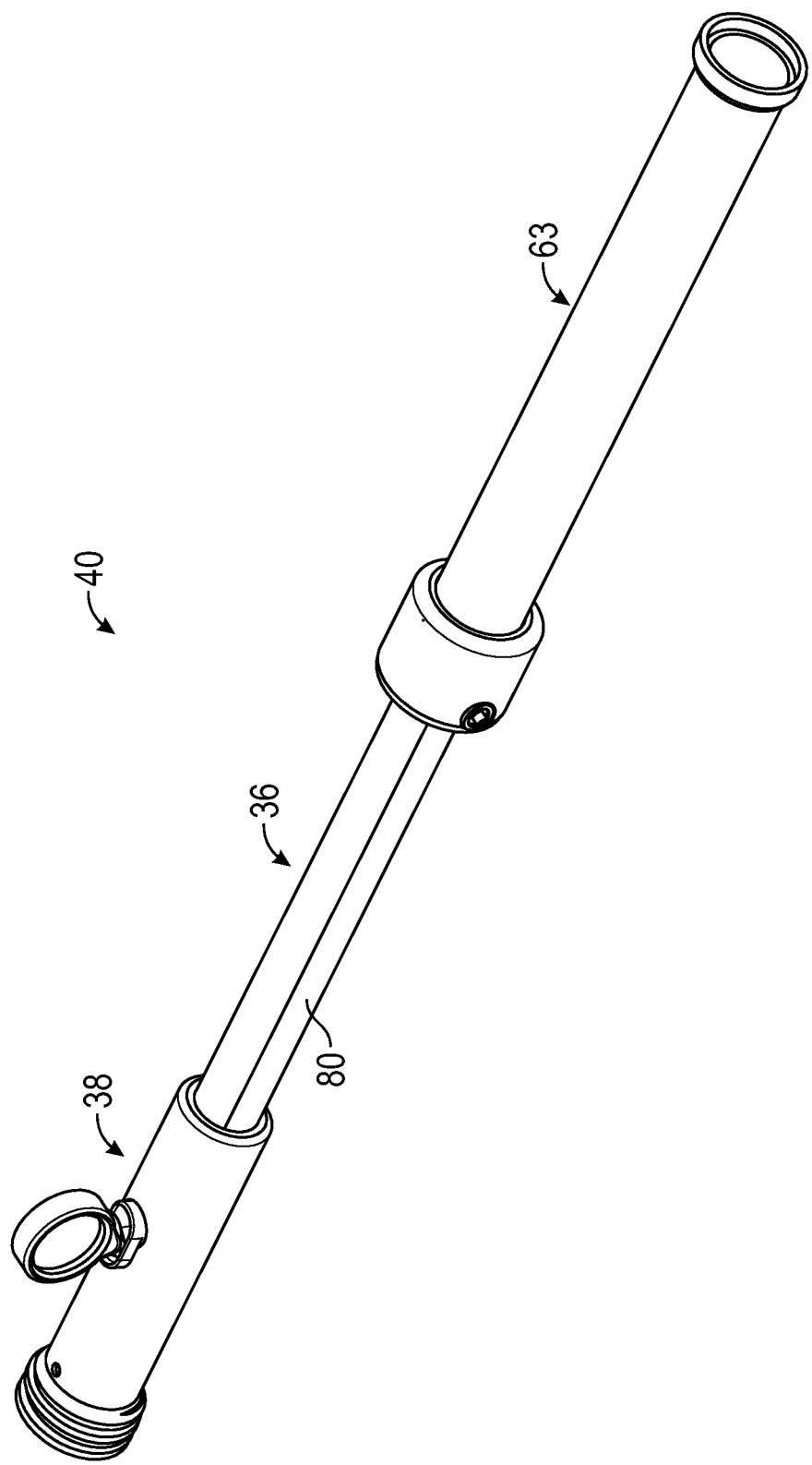
FIG. 20 is an enlarged perspective view of an embodiment of the telescoping rod assembly with a joint tube.

FIGS. 18 & 19 show enlarged and exploded perspective views, respectively, of an embodiment of telescoping rod assembly 40. FIG. 20 is an enlarged perspective view of an embodiment of telescoping rod assembly 40 and joint tube 63 of the bone fixator. When the rod assembly is unlocked, internal tube 36 and external tube 38 extend telescopically (i.e., internal tube 36 is slidingly positionable within external tube 38) to adjust the length of the telescoping rod assembly. An operator can elongate the telescoping feature from a minimal to maximum position or to any position within that range for distraction and reduction of fracture fragments. A locking tab 43 may be removed, actuating a spring-loaded internal clutch 45 to retain the internal and external tubes in a desired position. In some embodiments, locking tab 43 can be temporarily removed to hold the rods after the physician distracts the frame. As shown in FIG. 20, internal tube 36 has a flat surface 80 which is used for anti-rotation of the telescoping rod assembly. When the telescoping function is locked by the internal clutch 45, the adjustment handle 44 (see FIG. 1) allows for fine adjustment to the final position. Adapter 84 may include set screws 68 to provide retention of locking positions and deter a patient from tampering with the settings. This telescoping rod assembly design provides the operator the ability to manipulate the fixator without additional assistance.

As shown in FIG. 19, with reference also to FIG. 2, an embodiment of telescoping rod assembly 40 may include an clutch 45 which is threadably coupled to internal tube 36 and passed through adapter 84. Clutch 45 may be threadably coupled to a rod 81 and actuated by rod 81 and connected plug 83. External tube 38 may be threadably coupled to adjustment handle 44 and cross pinned to attachment 86, coupled to fixator joint 26 (see FIG. 2). When adjustment handle 44 is rotated, a slight adjustment is made to the length of the assembly, which allows for compression or distraction at the fracture site. Adjustment handle 44 may further include a mechanism to lock rotation of the handle, such as locking rings 88 with spring loaded pins to provide a tamper proof feature.

Figure 21:
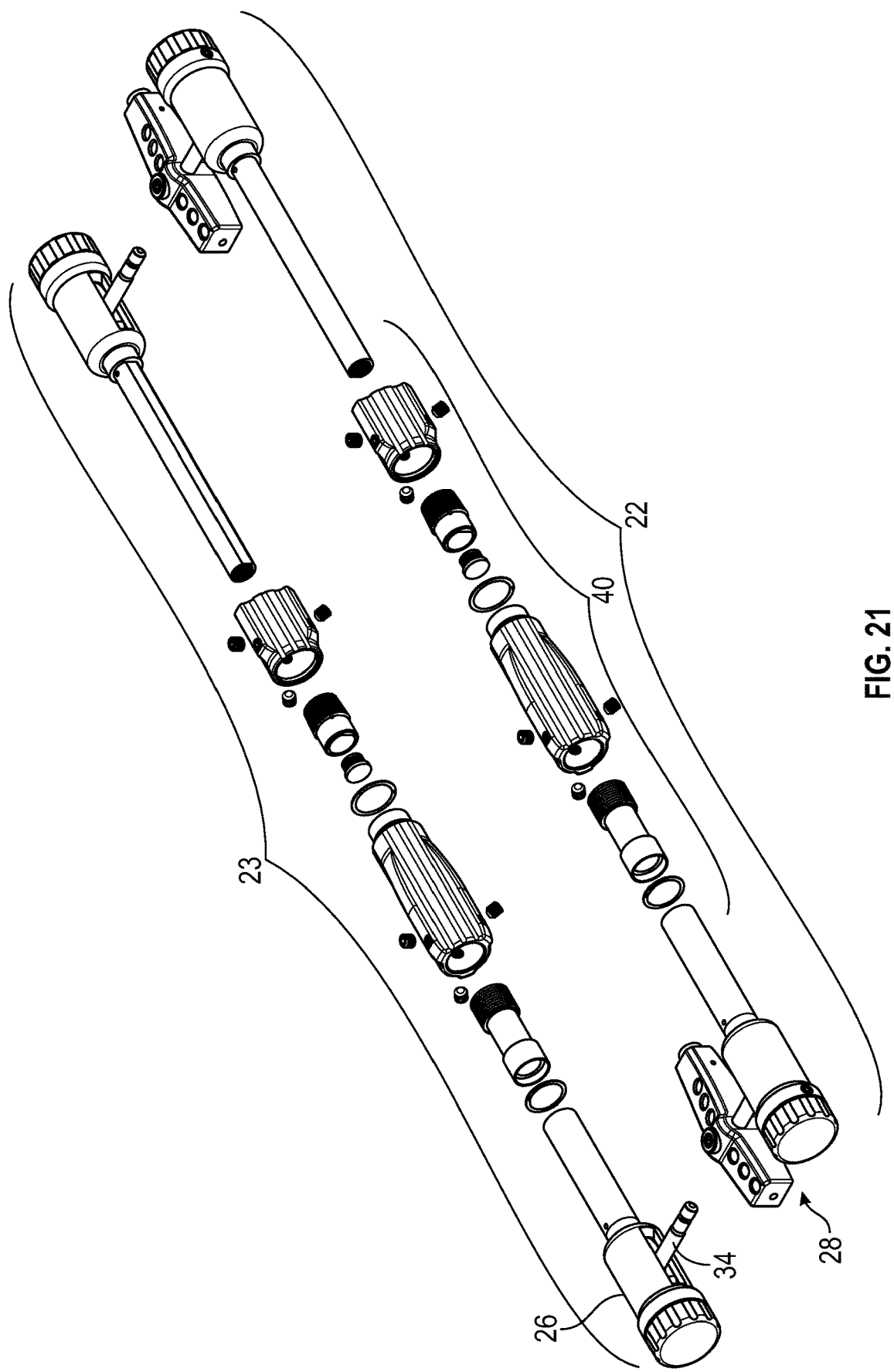
FIG. 21 is an exploded perspective view of another embodiment of the bone fixator.
Figure 22:
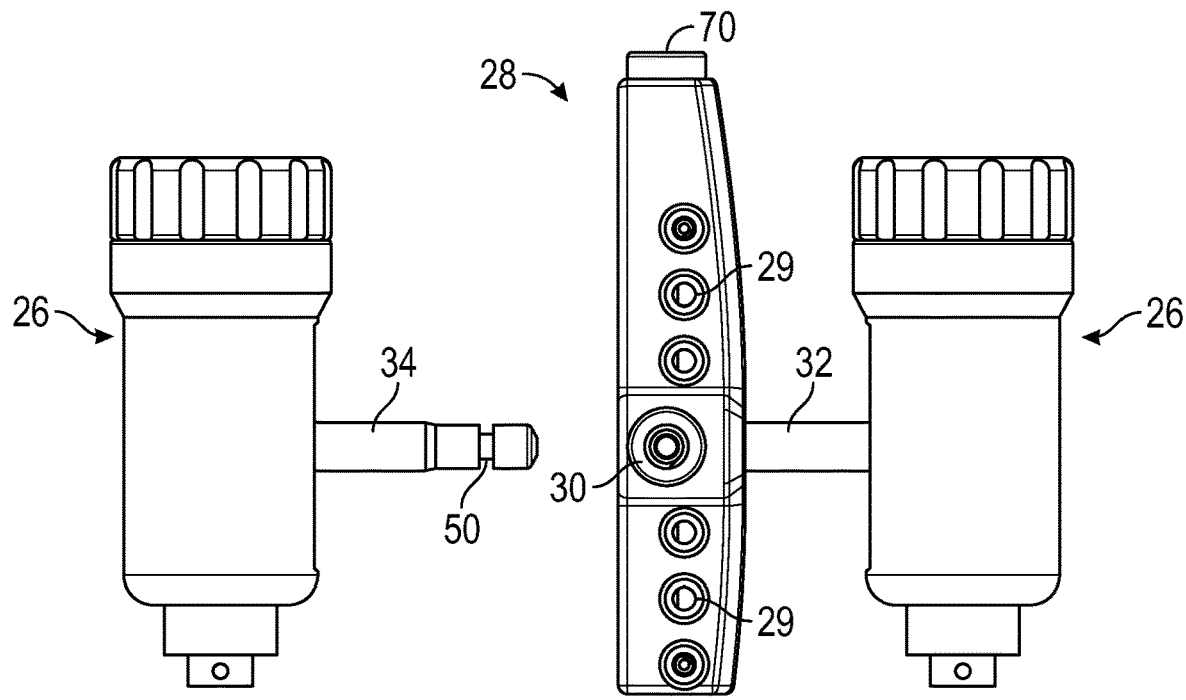
FIG. 22 is an enlarged top plan view of a portion of another embodiment of the bone fixator, showing a fixator joint disengaged from a multi-pin clamp.

FIGS. 21 & 22 are exploded perspective and partial enlarged top plan views, respectively, of another embodiment of bone fixator 20. The shown embodiment includes a first removable portion 23 and a fixed portion 22. First removable portion 23 may quickly and easily be disconnected from at least one multi-pin clamp 28 while the multi-pin clamp 28 and fixed portion 22 may remain fixed to the patient. First removable portion 23 includes a telescoping rod assembly 40 with a fixator joint 26 at each end. First removable portion 23 couples to multi-pin clamps 28 via linkage bar 34 in a manner similar to that described for other embodiments discussed herein. FIG. 22 shows linkage bar 34 disengaged from multi-pin clamp 28. A first button 30 on multi-pin clamp 28 may control the engagement of linkage bar 34.

Fixator joints 26 of fixed portion 22 each include a fixed linkage bar 32. The fixed linkage bars are configured for permanent connection with multi-pin clamp 28. Fixed linkage bar 32 may be connected to the multi-pin clamp, such as with a fastener, a quick connect mechanism, or other connection that may be readily apparent to those skilled in the art, and may be substituted, mutatis mutandis, for the connector types shown in these exemplary embodiments.

A second button 70 of multi-pin clamp 28 may be used to release one or more rails 72 for movement between locked and free positions, in a similar manner as described for other embodiments.

Figure 23:
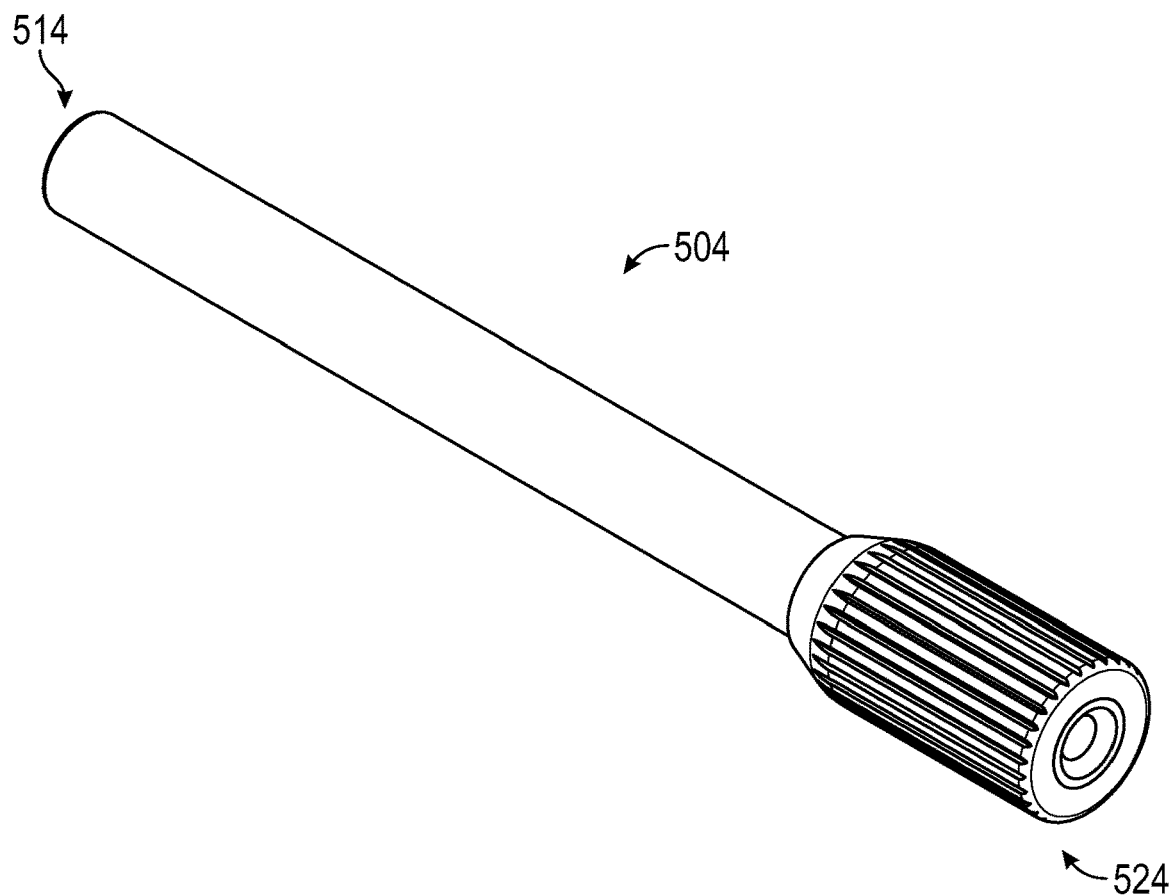
FIG. 23 is an enlarged perspective view of an embodiment of a cooperating drill sleeve.

FIG. 23 is an enlarged perspective view of an embodiment of a cooperating drill sleeve 504. The drill sleeve is sized to pass through an aperture 29 of multi-pin clamp 28. The injured area is cannulated by the drill sleeve, which includes a concave surface 514 on one end to better conform to the bone. The opposite end may be fitted with a handle 524 or a knob or the like, which may be removable (for example, by snapping on or threading on). Drill sleeve 504 allows passage of a trocar, a drill, and/or the bone screw while protecting surrounding tissues. The drill sleeve will protect tissues from thermal necrosis and allow accurate drilling or fixation of the bone screw into bone.

Figure 24:
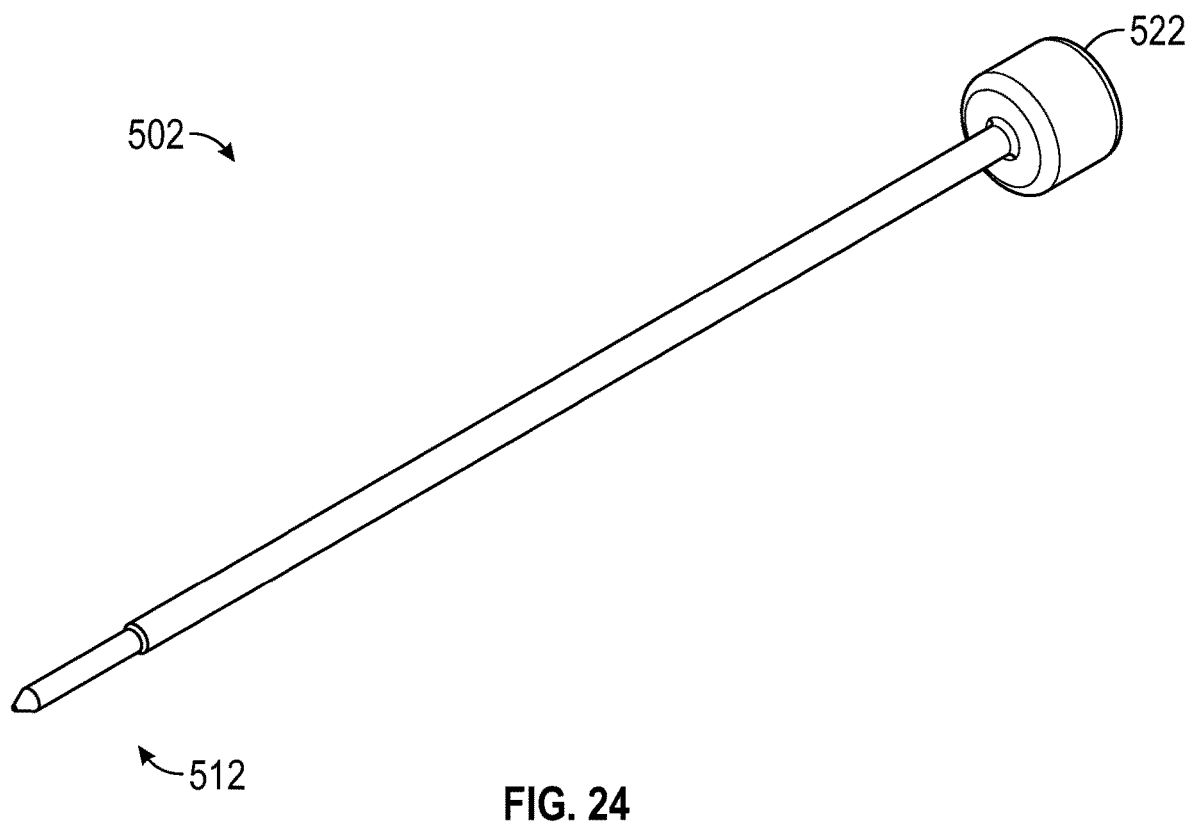
FIG. 24 is an enlarged perspective view of an embodiment of a cooperating trocar.

FIG. 24 is an enlarged perspective view of an embodiment of a cooperating trocar 502. Trocar 502 has a tip at one end which is used to clear tissue down to bone, allowing the drill sleeve to be inserted flush with the bone. The trocar enters the cannulated drill sleeve prior to drilling and driving the bone screw. The opposite end of the trocar may be a flat end 522, which can be tapped with a mallet to ensure the trocar tip is down to bone. The trocar may be a solid aluminum or plastic instrument.

Further provided is a kit including a bone fixator according to any of the embodiments described above. The bone fixator may be pre-assembled and provided in a sterilized package, such as a plastic tray. The kit may include any or all of the following: bone screws (pins), drill bits, trocar, drill sleeve, protective pin caps, a tightening wrench, other instrumentation, or instructions, such as for the short-term stabilization of the femur and tibia, mid-tibia to distal tibia, and tibia to foot. The kit and/or components thereof may be disposable after a single use.

An exemplary embodiment of a bone fixation kit includes: an assembled knee-spanning external fixator, a drill bit, 4 mm and 5 mm half-pins, a trocar, a T-handle wrench, pin caps, a drill sleeve, and a wrench for set screws. All components of the example kit are ETO sterilized and sealed in a Tyvek tray.

Example Method of Use

In an example method of use, the fixator is mounted by placing it on top of the femur and tibia and initially fixating the two bone screws in the femur either anterior to posterior, anterior lateral, or lateral to medial orientation. The distal multi-pin clamp is secured to the tibia with two bone screws in an anterior to posterior position. The operator pulls on the tibia and end of the external fixator until the fracture is properly reduced and the telescoping rods and fixator joints are locked into place providing temporizing fixation. The final locking position is achieved by turning the adjustment handle to the desired length. Once the device is securely positioned, the locking tabs are removed and all set screws are tightened locking the device into position.

While various embodiments of the present invention have been disclosed and described in detail herein, it will be apparent to those skilled in the art that various changes may be made to the configuration, operation and form of the invention without departing from the spirit and scope thereof. In particular, it is noted that the respective features of the invention, even those disclosed solely in combination with other features of the invention, may be combined in any configuration excepting those readily apparent to the person skilled in the art as nonsensical. Likewise, use of the singular and plural is solely for the sake of illustration and is not to be interpreted as limiting.

The invention claimed is:

1. A bone fixator comprising:
   at least two multi-pin clamps structurally configured for fixation to a bone, each of the multi-pin clamps including an actuator connected to a quick connect mechanism;
   a first portion including a telescoping rod assembly terminating in a fixator joint on each of two opposing ends, each fixator joint of the first portion including a linkage bar having a shaft including a circumferential groove, the linkage bar connectable to one of the at least two multi-pin clamps via engagement of the circumferential groove with the quick connect mechanism and removable therefrom via operation of the actuator to disengage the quick connect mechanism from the circumferential groove;
   a second portion including a telescoping rod assembly terminating in a fixator joint on each of two opposing ends, each fixator joint of the second portion including a linkage bar connectable to one of the at least two multi-pin clamps;
   each fixator joint including a joint housing, the linkage bar extending from the joint housing and rotatably positionable within the joint housing; and wherein each fixator joint is structurally configured for articulation in multiple independent rotational degrees of freedom.

2. The bone fixator of claim 1, wherein:
each linkage bar is rotatably positionable within the joint housing over an angular range of at least 85 degrees.

3. The bone fixator of claim 1, wherein:
each fixator joint is rotatably positionable about a central longitudinal axis of the linkage bar.

4. The bone fixator of claim 3, wherein:
each fixator joint is rotatably positionable about the central longitudinal axis of the linkage bar over an angular range of 360 degrees.

5. The bone fixator of claim 1, comprising:
each multi-pin clamp including an adjustably positionable internal rail having a scalloped face structurally configured to retain a bone screw within the multi-pin clamp.

6. The bone fixator of claim 1, comprising:
a quick release mechanism structurally configured to decouple the linkage bar from the multi-pin clamp.

7. The bone fixator of claim 1, comprising:
the telescoping rod assembly having an adjustable length.

8. The bone fixator of claim 1, wherein:
the telescoping rod assembly is rotatably positionable within the joint housing.

9. The bone fixator of claim 1, comprising:
each multi-pin clamp having a locking joint knob configured to retain the fixator joint in position.

10. The bone fixator of claim 1, wherein:
when the circumferential groove is engaged with the quick connect mechanism, the quick connect mechanism resists decoupling of the linkage bar, while allowing the linkage bar to rotate 360 degrees about a longitudinal axis of the linkage bar.

11. A bone fixator comprising:
two multi-pin clamps structurally configured for fixation to a bone, the multi-pin clamps each having a first side and an opposing second side, each of the multi-pin clamps including an actuator connected to a quick connect mechanism;
a first portion including a telescoping rod assembly terminating in a fixator joint on each of two opposing ends, each fixator joint of the first portion including a linkage bar having a shaft including a circumferential groove, the linkage bar connectable to the first side of each of the two multi-pin clamps via engagement of the circumferential groove with the quick connect mechanism and removable therefrom via operation of the actuator to disengage the quick connect mechanism from the circumferential groove;
a second portion including a telescoping rod assembly terminating in a fixator joint on each of two opposing ends, each fixator joint of the second portion including a linkage bar removably connectable to the second side of each of the two multi-pin clamps; and
each fixator joint including a joint housing, the linkage bar extending from the joint housing;
wherein each fixator joint is structurally configured for articulation in multiple independent rotational degrees of freedom.

12. The bone fixator of claim 11, wherein:
when the circumferential groove is engaged with the quick connect mechanism, the quick connect mechanism resists decoupling of the linkage bar, while allowing the linkage bar to rotate 360 degrees about a longitudinal axis of the linkage bar.

13. A fixator joint for a bone fixator in cooperation with a bone clamp, the fixator joint comprising:
a joint housing;
a linkage bar extending from the joint housing and structurally configured for removable connection to the bone clamp, the linkage bar having a shaft including a circumferential groove;
wherein the linkage bar is rotatably positionable within the joint housing;
wherein the joint housing and the linkage bar are rotatably positionable about a longitudinal axis of the linkage bar when the linkage bar is connected to the bone clamp via engagement with the circumferential groove;
wherein the joint housing is rotatably positionable about a longitudinal axis of a rod of the bone fixator; and
wherein the linkage bar is structurally configured for quick release connection to the bone clamp via disengagement with the circumferential groove.

14. The fixator joint of claim 13, wherein:
the linkage bar is rotatably positionable within the joint housing over an angular range of at least 85 degrees.

15. The fixator joint of claim 13, wherein:
the fixator joint is rotatably positionable about the longitudinal axis of the linkage bar over an angular range of 360 degrees.

16. The fixator joint of claim 13, wherein:
the joint housing is rotatably positionable about the longitudinal axis of the rod over an angular range of 360 degrees.

* * * * *